US012684464B2

(12) United States Patent
Lei et al.

(10) Patent No.: US 12,684,464 B2
(45) Date of Patent: Jul. 14, 2026

(54) PRIMARY SYNCHRONIZATION SIGNAL BURST THAT IS SEPARATE FROM A SECONDARY SYNCHRONIZATION SIGNAL BURST

(71) Applicant: QUALCOMM Incorporated, San Diego, CA (US)

(72) Inventors: Jing Lei, San Diego, CA (US); Yongle Wu, San Diego, CA (US); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 328 days.

(21) Appl. No.: 18/463,929

(22) Filed: Sep. 8, 2023

(65) Prior Publication Data

US 2024/0251332 A1 Jul. 25, 2024

Related U.S. Application Data

(60) Provisional application No. 63/481,515, filed on Jan. 25, 2023.

(51) Int. Cl.
*H04W 48/10* (2009.01)
(52) U.S. Cl.
CPC .................................. *H04W 48/10* (2013.01)
(58) Field of Classification Search
CPC .................................................... H04W 48/10
See application file for complete search history.

(56) References Cited

U.S. PATENT DOCUMENTS

| 9,591,597 B2 * | 3/2017 | Son | H04W 72/27 |
| 11,950,287 B2 * | 4/2024 | Zhou | H04B 7/06964 |
| 2012/0046056 A1 * | 2/2012 | Luo | H04J 11/0093 |
| | | | 455/502 |
| 2012/0122453 A1 * | 5/2012 | Shin | H04L 25/022 |
| | | | 455/434 |
| 2014/0169336 A1 * | 6/2014 | Oh | H04W 36/08 |
| | | | 370/332 |
| 2015/0016337 A1 * | 1/2015 | Chung | H04L 5/0012 |
| | | | 370/328 |
| 2015/0016339 A1 * | 1/2015 | You | H04W 56/0015 |
| | | | 370/328 |
| 2015/0018010 A1 * | 1/2015 | Fischer | H04W 76/28 |
| | | | 455/456.2 |
| 2015/0289147 A1 * | 10/2015 | Lou | H04B 7/0634 |
| | | | 370/329 |
| 2015/0350964 A1 * | 12/2015 | Lin | H04W 36/00226 |
| | | | 455/436 |
| 2016/0149660 A1 * | 5/2016 | Seo | H04W 76/14 |
| | | | 370/336 |
| 2016/0262123 A1 * | 9/2016 | Abedini | H04J 13/0062 |
| 2016/0302098 A1 * | 10/2016 | Gheorghiu | H04W 56/001 |
| 2017/0013577 A1 * | 1/2017 | Berggren | H04W 72/1215 |

(Continued)

*Primary Examiner* — Dung B Huynh
(74) *Attorney, Agent, or Firm* — Harrity & Harrity, LLP

(57) ABSTRACT

Various aspects of the present disclosure generally relate to wireless communication. In some aspects, a network node may transmit, based at least in part on a first transmission, a primary synchronization signal (PSS) burst. The network node may transmit, based at least in part on a second transmission, a secondary synchronization signal (SSS) burst, the second transmission being non-overlapping in a time domain with the first transmission. Numerous other aspects are described.

30 Claims, 13 Drawing Sheets

(56) References Cited

U.S. PATENT DOCUMENTS

| | | | | |
|---|---|---|---|---|
| 2017/0064613 A1* | 3/2017 | Harada | H04J 11/0079 |
| 2017/0070937 A1* | 3/2017 | Li | H04W 36/0058 |
| 2017/0093540 A1* | 3/2017 | Lei | H04L 27/2655 |
| 2017/0094624 A1* | 3/2017 | Balachandran | H04W 72/542 |
| 2017/0127367 A1* | 5/2017 | Axnäs | H04W 72/0446 |
| 2017/0325260 A1* | 11/2017 | Guo | H04W 74/006 |
| 2018/0049082 A1* | 2/2018 | Kinthada Venkata | |
| | | | H04W 36/302 |
| 2018/0084593 A1* | 3/2018 | Chen | H04L 5/0048 |
| 2018/0091341 A1* | 3/2018 | Sadiq | H04L 5/0053 |
| 2018/0109345 A1* | 4/2018 | Svedman | H04W 72/23 |
| 2018/0234931 A1* | 8/2018 | Ly | H04W 72/30 |
| 2018/0241458 A1* | 8/2018 | Jung | H04B 7/0695 |
| 2018/0242287 A1* | 8/2018 | Chae | H04J 13/00 |
| 2018/0248642 A1* | 8/2018 | Si | H04L 5/0053 |
| 2018/0249497 A1* | 8/2018 | Noh | H04L 5/005 |
| 2018/0262900 A1* | 9/2018 | Moon | H04L 27/26 |
| 2018/0302182 A1* | 10/2018 | Ly | H04J 11/0073 |
| 2018/0309495 A1* | 10/2018 | Xiong | H04B 7/06966 |
| 2018/0324722 A1* | 11/2018 | Vos | H04W 56/001 |
| 2018/0324732 A1* | 11/2018 | Park | H04L 27/2613 |
| 2018/0343043 A1* | 11/2018 | Hakola | H04W 36/0016 |
| 2018/0343595 A1* | 11/2018 | da Silva | H04W 74/0833 |
| 2018/0359717 A1* | 12/2018 | Akkarakaran | H04W 8/005 |
| 2018/0368089 A1* | 12/2018 | Yerramalli | H04L 5/0048 |
| 2018/0376438 A1* | 12/2018 | Islam | H04W 72/046 |
| 2019/0028942 A1* | 1/2019 | Tang | H04W 36/0077 |
| 2019/0053120 A1* | 2/2019 | Park | H04W 74/0833 |
| 2019/0053271 A1* | 2/2019 | Islam | H04W 74/006 |
| 2019/0069258 A1* | 2/2019 | Jeon | H04W 56/0045 |
| 2019/0090293 A1* | 3/2019 | Su | H04W 76/14 |
| 2019/0165831 A1* | 5/2019 | Zhou | H04B 7/0408 |
| 2019/0173628 A1* | 6/2019 | Ko | H04W 72/0453 |
| 2019/0173719 A1* | 6/2019 | Qin | H04L 27/26136 |
| 2019/0182800 A1* | 6/2019 | Park | H04W 80/08 |
| 2019/0215888 A1* | 7/2019 | Cirik | H04B 7/0695 |
| 2019/0223094 A1* | 7/2019 | Ingale | H04W 68/005 |
| 2019/0312702 A1* | 10/2019 | Yan | H04L 5/0094 |
| 2019/0313434 A1* | 10/2019 | Zhou | H04W 72/23 |
| 2019/0319699 A1* | 10/2019 | Lee | H04W 56/0015 |
| 2019/0320430 A1* | 10/2019 | Kim | H04W 72/51 |
| 2020/0015214 A1* | 1/2020 | Si | H04W 56/0015 |
| 2020/0022099 A1* | 1/2020 | Liu | H04W 72/30 |
| 2020/0037274 A1* | 1/2020 | Pan | H04W 72/046 |
| 2020/0068420 A1* | 2/2020 | Chen | H04W 36/0085 |
| 2020/0120526 A1* | 4/2020 | Da Silva | H04B 17/101 |
| 2020/0178350 A1* | 6/2020 | Miao | H04W 74/0833 |
| 2020/0196173 A1* | 6/2020 | Da Silva | H04B 7/06952 |
| 2020/0196277 A1* | 6/2020 | Zhou | H04W 72/02 |
| 2020/0229114 A1* | 7/2020 | Ryu | H04L 27/2613 |
| 2020/0259588 A1* | 8/2020 | Iyer | H04L 5/0007 |
| 2020/0275297 A1* | 8/2020 | Jung | H04B 7/0626 |
| 2020/0275393 A1* | 8/2020 | Shin | H04J 11/0073 |
| 2020/0280466 A1* | 9/2020 | Cui | H04L 25/0226 |
| 2020/0296765 A1* | 9/2020 | Kim | H04W 56/0015 |
| 2020/0344742 A1* | 10/2020 | Chen | H04B 7/0695 |
| 2020/0404617 A1* | 12/2020 | Murray | H04W 52/0229 |
| 2020/0413309 A1* | 12/2020 | Zhu | H04B 7/024 |
| 2021/0007076 A1* | 1/2021 | Ljung | H04W 76/28 |
| 2021/0014809 A1* | 1/2021 | Lee | H04B 17/318 |
| 2021/0068101 A1* | 3/2021 | Chen | H04L 1/0072 |
| 2021/0105645 A1* | 4/2021 | Rune | H04W 24/10 |
| 2021/0144573 A1* | 5/2021 | Yoon | H04B 17/327 |
| 2021/0152413 A1* | 5/2021 | Ko | H04W 56/001 |
| 2021/0153107 A1* | 5/2021 | Xu | H04W 72/04 |
| 2021/0167884 A1* | 6/2021 | Chen | H04W 72/23 |
| 2021/0167996 A1* | 6/2021 | Ratnam | H04B 7/0617 |
| 2021/0243609 A1* | 8/2021 | Lei | H04L 5/0048 |
| 2021/0243706 A1* | 8/2021 | Liu | H04L 5/0007 |
| 2021/0266841 A1* | 8/2021 | Li | H04W 72/23 |
| 2021/0337494 A1* | 10/2021 | Ye | H04L 27/2605 |
| 2021/0345268 A1* | 11/2021 | Luo | H04W 72/0453 |
| 2021/0345407 A1* | 11/2021 | Myung | H04L 27/2607 |
| 2021/0360430 A1* | 11/2021 | Reial | H04W 56/001 |
| 2022/0078735 A1* | 3/2022 | Saggar | H04L 27/261 |
| 2022/0131584 A1* | 4/2022 | Dalsgaard | H04L 5/0048 |
| 2022/0150946 A1* | 5/2022 | Tsai | H04W 76/28 |
| 2022/0151000 A1* | 5/2022 | Virtej | H04L 5/0051 |
| 2022/0159557 A1* | 5/2022 | Zhu | H04W 56/001 |
| 2022/0200824 A1* | 6/2022 | Sakhnini | H04L 5/0048 |
| 2022/0201631 A1* | 6/2022 | Wu | H04W 56/0005 |
| 2022/0210751 A1* | 6/2022 | Lee | H04W 52/48 |
| 2022/0264489 A1* | 8/2022 | Sakhnini | H04L 27/2636 |
| 2022/0286985 A1* | 9/2022 | Ren | H04J 11/0076 |
| 2022/0303795 A1* | 9/2022 | Bala | H04B 7/06964 |
| 2022/0338146 A1* | 10/2022 | Sha | H04W 48/10 |
| 2022/0417819 A1* | 12/2022 | Cui | H04J 11/0093 |
| 2023/0018952 A1* | 1/2023 | Wu | H04W 74/0866 |
| 2023/0042071 A1* | 2/2023 | Ahmadian Tehrani | |
| | | | H04W 72/23 |
| 2023/0077982 A1* | 3/2023 | Nattha | H04B 7/06958 |
| | | | 370/329 |
| 2023/0095823 A1* | 3/2023 | Tseng | H04W 36/0077 |
| | | | 370/331 |
| 2023/0140608 A1* | 5/2023 | Zander | H04B 7/06954 |
| | | | 375/267 |
| 2023/0152413 A1* | 5/2023 | Kim | H04L 5/0051 |
| | | | 370/329 |
| 2023/0155797 A1* | 5/2023 | Xie | H04W 72/20 |
| | | | 370/329 |
| 2023/0156640 A1* | 5/2023 | Jiang | H04J 11/0073 |
| | | | 370/503 |
| 2023/0164795 A1* | 5/2023 | Nam | H04L 5/0053 |
| | | | 370/329 |
| 2023/0188196 A1* | 6/2023 | Zander | H04B 7/0695 |
| | | | 370/252 |
| 2023/0216642 A1* | 7/2023 | Zhang | H04W 48/08 |
| 2023/0224777 A1* | 7/2023 | Raghavan | H04W 36/0058 |
| 2023/0254076 A1* | 8/2023 | Hedayat | H04W 48/14 |
| | | | 370/278 |
| 2023/0262726 A1* | 8/2023 | Bai | H04W 72/232 |
| | | | 370/329 |
| 2023/0269600 A1* | 8/2023 | Zhu | H04W 16/28 |
| | | | 370/329 |
| 2023/0269749 A1* | 8/2023 | Palle Venkata | H04W 74/0833 |
| | | | 370/329 |
| 2023/0300813 A1* | 9/2023 | Bi | H04W 72/046 |
| | | | 370/329 |
| 2023/0345390 A1* | 10/2023 | Yin | H04B 7/15528 |
| 2023/0388167 A1* | 11/2023 | Cheema | H04L 27/261 |
| 2023/0397159 A1* | 12/2023 | Li | H04W 52/0216 |
| 2023/0403664 A1* | 12/2023 | He | H04L 5/0048 |
| 2024/0007169 A1* | 1/2024 | Da Silva | H04B 7/088 |
| 2024/0022973 A1* | 1/2024 | Ramachandra | H04W 36/0058 |
| 2024/0098518 A1* | 3/2024 | Bar-Or Tillinger | |
| | | | H04B 7/15528 |
| 2024/0098613 A1* | 3/2024 | Zhou | H04W 36/30 |
| 2024/0107499 A1* | 3/2024 | Dallal | H04B 7/06952 |
| 2024/0107603 A1* | 3/2024 | Wu | H04L 5/14 |
| 2024/0113771 A1* | 4/2024 | Fariss | H04B 7/15557 |
| 2024/0137179 A1* | 4/2024 | Abebe | H04W 52/42 |
| 2024/0162967 A1* | 5/2024 | Wang | H04W 72/0446 |
| 2024/0179676 A1* | 5/2024 | Chen | H04W 68/02 |
| 2024/0187200 A1* | 6/2024 | Zhou | H04L 5/0053 |
| 2024/0205676 A1* | 6/2024 | Damnjanovic | H04W 74/0833 |
| 2024/0224299 A1* | 7/2024 | Xiao | H04L 5/0051 |
| 2024/0284193 A1* | 8/2024 | Matsumura | H04W 56/001 |
| 2024/0297737 A1* | 9/2024 | Guo | H04L 1/08 |
| 2024/0340796 A1* | 10/2024 | Zhou | H04L 1/0027 |
| 2024/0365333 A1* | 10/2024 | Nagano | H04W 76/27 |
| 2024/0373366 A1* | 11/2024 | Li | H04W 74/0833 |
| 2024/0383826 A1* | 11/2024 | Haghighat | H04L 5/0048 |
| 2025/0007591 A1* | 1/2025 | Athley | H04B 7/088 |
| 2025/0039917 A1* | 1/2025 | Matsumura | H04L 5/0053 |
| 2025/0081103 A1* | 3/2025 | Zhou | H04W 76/27 |
| 2025/0089097 A1* | 3/2025 | Shah | H04W 72/115 |
| 2025/0096970 A1* | 3/2025 | Jung | H04L 5/0007 |
| 2025/0142578 A1* | 5/2025 | Tiirola | H04L 5/0053 |
| 2025/0159626 A1* | 5/2025 | Khan Beigi | H04J 11/0076 |
| 2025/0175298 A1* | 5/2025 | Feng | H04W 72/20 |
| 2025/0220523 A1* | 7/2025 | Da Silva | H04W 74/004 |
| 2025/0226956 A1* | 7/2025 | Li | H04W 72/54 |
| 2025/0254675 A1* | 8/2025 | Guo | H04L 5/0091 |

(56) References Cited

U.S. PATENT DOCUMENTS

| 2025/0286601 A1* | 9/2025 | Zhang | ................... | H04W 16/28 |
| 2025/0286686 A1* | 9/2025 | Niu | ....................... | H04L 5/0053 |
| 2025/0358061 A1* | 11/2025 | Amuru | ............... | H04L 27/2613 |

* cited by examiner

1010    Transmit, based at least in part on a first transmission, a primary synchronization signal (PSS) burst 1020    Transmit, based at least in part on a second transmission, a secondary synchronization signal (SSS) burst, the second transmission being non-overlapping in a time domain with the first transmission

1000

1100

1110 — Receive, based at least in part on a first transmission, a primary synchronization signal (PSS) burst 1120 — Receive, based at least in part on a second transmission, a secondary synchronization signal (SSS) burst, the second transmission being non-overlapping in a time domain with the first transmission

PRIMARY SYNCHRONIZATION SIGNAL BURST THAT IS SEPARATE FROM A SECONDARY SYNCHRONIZATION SIGNAL BURST

CROSS-REFERENCE TO RELATED APPLICATION

This Patent Application claims priority to U.S. Provisional Patent Application No. 63/481,515, filed on Jan. 25, 2023, entitled "PRIMARY SYNCHRONIZATION SIGNAL BURST THAT IS SEPARATE FROM A SECONDARY SYNCHRONIZATION SIGNAL BURST," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a primary synchronization signal burst that is separate from a secondary synchronization signal burst.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include transmitting, based at least in part on a first transmission, a primary synchronization signal (PSS) burst. The method may include transmitting, based at least in part on a second transmission, a secondary synchronization signal (SSS) burst, the second transmission being non-overlapping in a time domain with the first transmission.

Some aspects described herein relate to a method of wireless communication performed by a user equipment (UE). The method may include receiving, based at least in part on a first transmission, a PSS burst. The method may include receiving, based at least in part on a second transmission, an SSS burst, the second transmission being non-overlapping in a time domain with the first transmission.

Some aspects described herein relate to an apparatus for wireless communication at a network node. The apparatus may include one or more memories and one or more processors coupled to the one or more memories. The one or more processors may be configured, individually or collectively, to cause the apparatus to transmit, based at least in part on a first transmission, a PSS burst. The one or more processors may be configured, individually or collectively, to cause the apparatus to transmit, based at least in part on a second transmission, an SSS burst, the second transmission being non-overlapping in a time domain with the first transmission.

Some aspects described herein relate to an apparatus for wireless communication at a UE. The apparatus may include one or more memories and one or more processors coupled to the one or more memories. The one or more processors may be configured, individually or collectively, to cause the apparatus to receive, based at least in part on a first transmission, a PSS burst. The one or more processors may be configured, individually or collectively, to cause the apparatus to receive, based at least in part on a second transmission, an SSS burst, the second transmission being non-overlapping in a time domain with the first transmission.

Some aspects described herein relate to a non-transitory computer-readable medium that stores a set of instructions for wireless communication by a network node. The set of instructions, when executed by one or more processors of the network node, may cause the network node to transmit, based at least in part on a first transmission, a PSS burst. The set of instructions, when executed by one or more processors of the network node, may cause the network node to transmit, based at least in part on a second transmission, an SSS burst, the second transmission being non-overlapping in a time domain with the first transmission.

Some aspects described herein relate to a non-transitory computer-readable medium that stores a set of instructions for wireless communication by a UE. The set of instructions, when executed by one or more processors of the UE, may cause the UE to receive, based at least in part on a first transmission, a PSS burst. The set of instructions, when executed by one or more processors of the UE, may cause the UE to receive, based at least in part on a second transmission, an SSS burst, the second transmission being non-overlapping with the first transmission in a time domain.

Some aspects described herein relate to an apparatus for wireless communication. The apparatus may include means for transmitting, based at least in part on a first transmission, a PSS burst. The apparatus may include means for transmitting, based at least in part on a second transmission, an SSS burst, the second transmission being non-overlapping in a time domain with the first transmission.

Some aspects described herein relate to an apparatus for wireless communication. The apparatus may include means for receiving, based at least in part on a first transmission, a PSS burst. The apparatus may include means for receiving, based at least in part on a second transmission, an SSS burst, the second transmission being non-overlapping in a time domain with the first transmission.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

During a measurement gap, a user equipment (UE) may suspend communications with a serving network node. Suspending the communications may result in a disruption to service provided to the UE, increase data-transfer latencies, and/or reduce data throughput. Aspects of the present disclosure describe a network node transmitting a primary synchronization signal (PSS) burst separately from a secondary synchronization signal (SSS) burst that may result in a decreased measurement gap at the UE. Decreasing the measurement gap may reduce a duration of the suspended communications, reduce the disruption to service provided to the UE, increase data throughput, and/or decrease data transfer delays.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
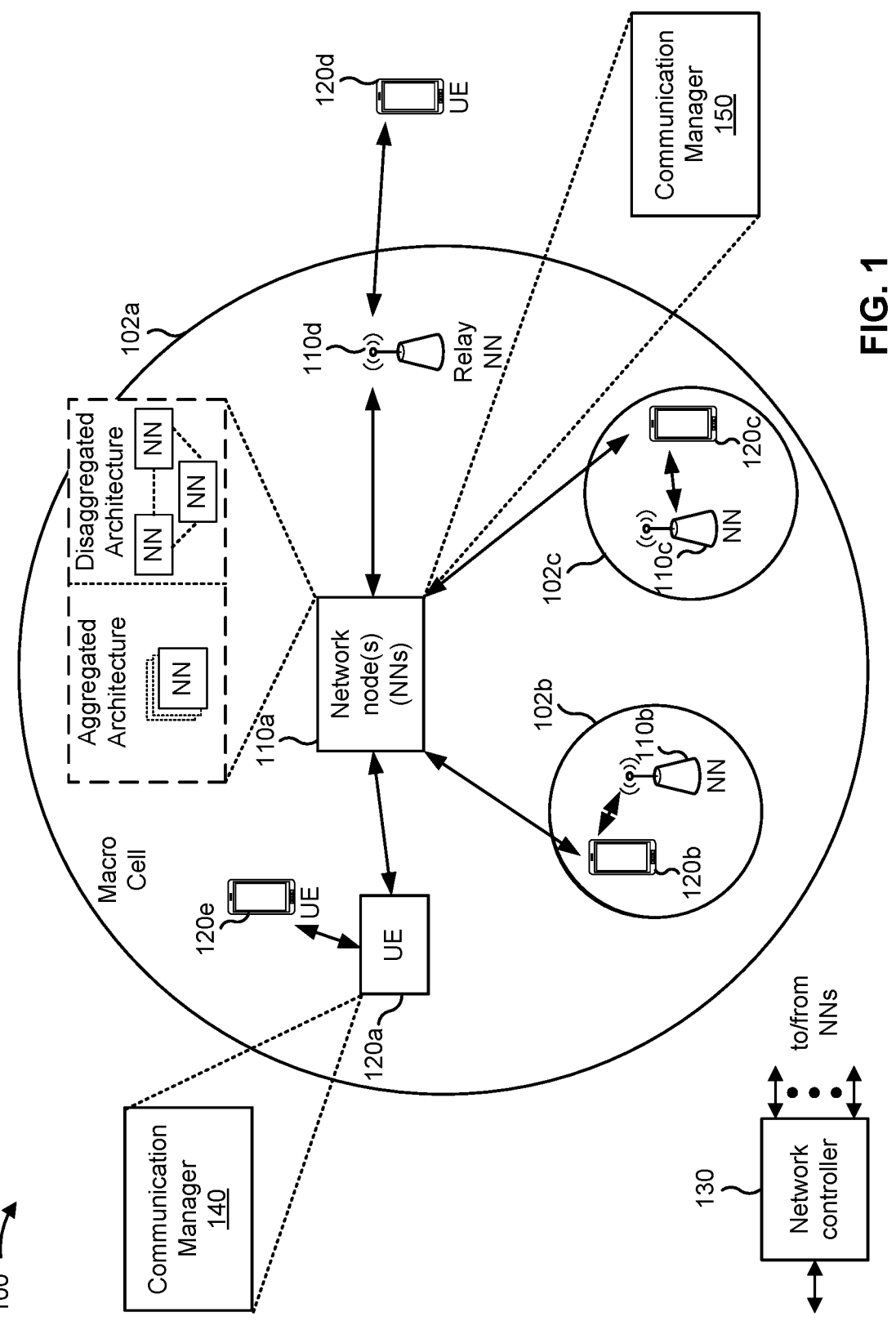
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" mayrefer to one or more virtual base stations or one or more virtual base station functions. For example, in some aspects, two or more base station functions may be instantiated on a single device. In some aspects, the terms "base station" or "network node" mayrefer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4(52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the network node 110) may include a communication manager 150. As described in more detail elsewhere herein, the communication manager 150 may transmit, based at least in part on a first transmission, a PSS burst; and transmit, based at least in part on a second transmission, an SSS burst, the second transmission being non-overlapping in a time domain with the first transmission. Additionally, or alternatively, the communication manager 150 may perform one or more other operations described herein.

In some aspects, a UE (e.g., the UE 120) may include a communication manager 140. As described in more detail elsewhere herein, the communication manager 140 may receive, based at least in part on a first transmission, a PSS burst; and receive, based at least in part on a second transmission, an SSS burst, the second transmission being non-overlapping in a time domain with the first transmission. Additionally, or alternatively, the communication manager 140 may perform one or more other operations described herein.

As indicated above, FIG. 1 is provided as an example. Other examples may differ from what is described with regard to FIG. 1.

Figure 2:
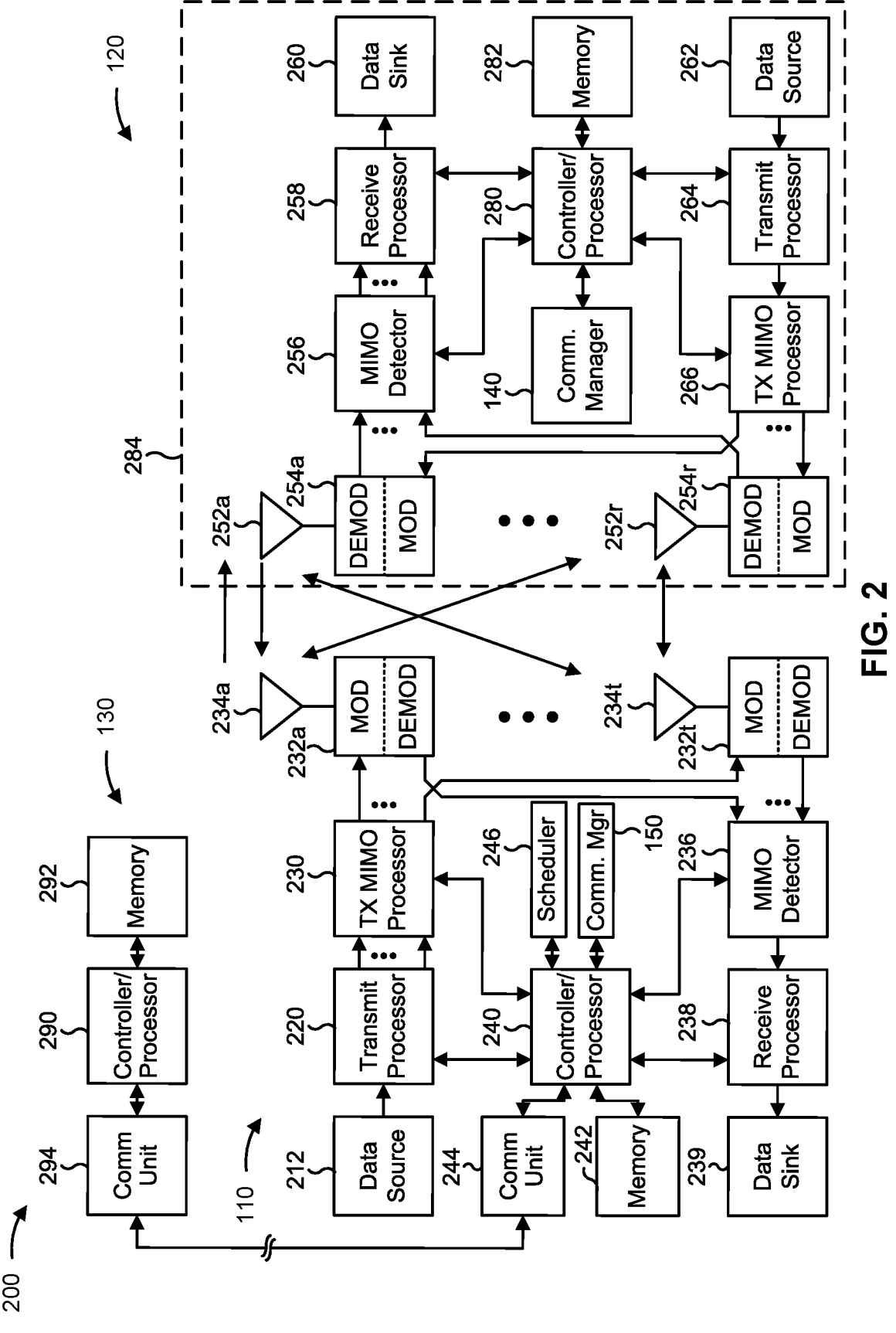
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., PSS or an SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-13).

The controller/processor 240 of the network node 110, the controller/processor 280 of the UE 120, and/or any other component(s) of FIG. 2 may perform one or more techniques associated with a PSS burst that is separate from an SSS burst, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a network node (e.g., the network node 110) includes means for transmitting, based at least in part on a first transmission, a PSS burst; and/or means for transmitting, based at least in part on a second transmission, an SSS burst, the second transmission being non-overlapping in a time domain with the first transmission. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for receiving, based at least in part on a first transmission, a PSS burst; and/or means for receiving, based at least in part on a second transmission, an SSS burst, the second transmission being non-overlapping in a time domain with the first transmission. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
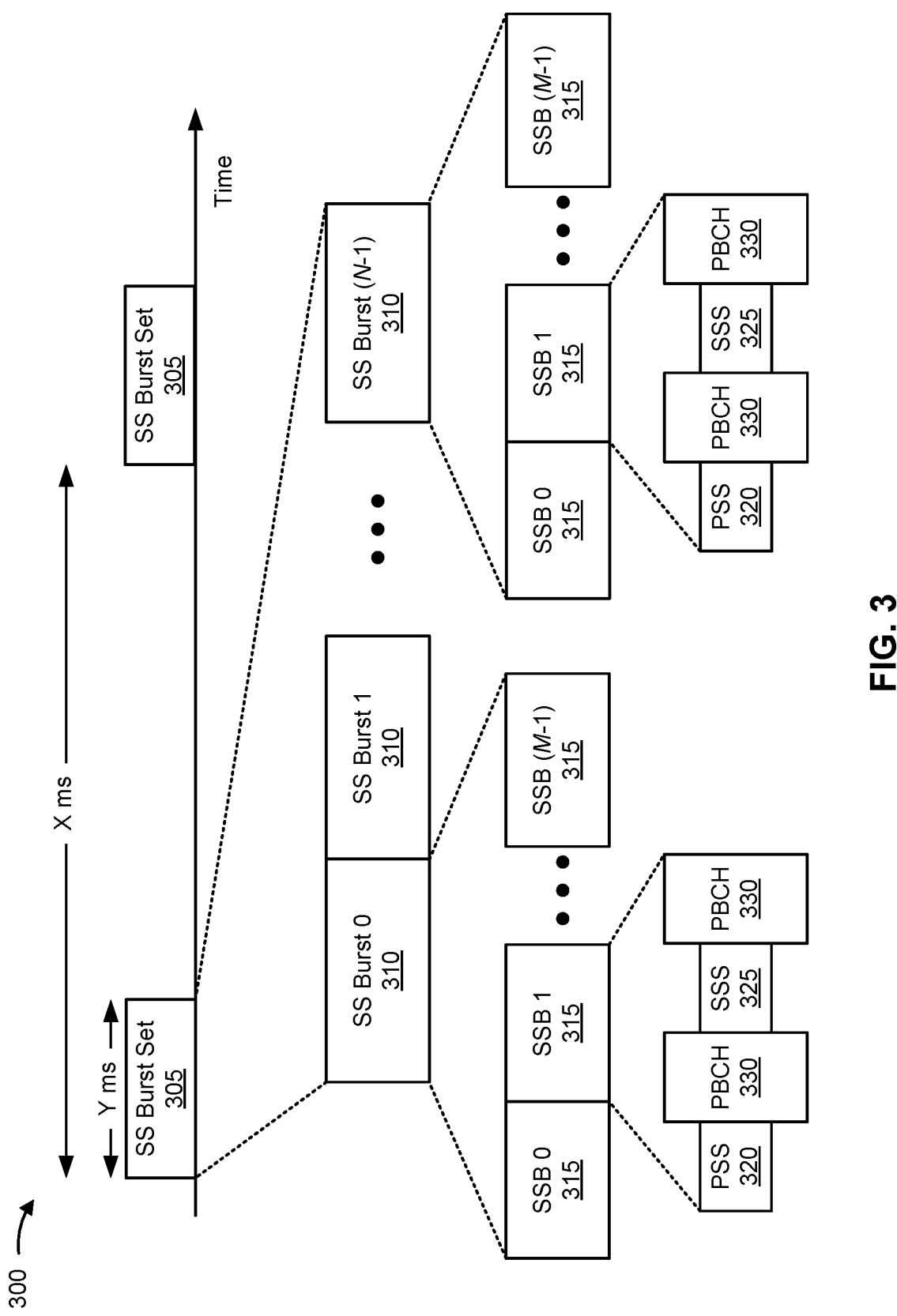
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by one or more network nodes. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless node (e.g., a network node 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a PSS 320, an SSS 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 may be consecutive, as shown in FIG. 3. In other aspects, the symbols of an SSB 315 may be non-consecutive. Similarly, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

The SS bursts 310 may have a burst period, and the SSBs 315 of the SS burst 310 may be transmitted by a wireless node (e.g., a network node 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., a reference signal received power (RSRP) parameter) to a network node 110 (e.g., directly or via one or more other network nodes). The network node 110 and the UE 120 may use the one or more indicated SSBs 315 to select one or more beams to be used for communication between the network node 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

In some aspects, the UE 120 may be configured with a neighbor cell list that identifies a set of neighbor cells (and an order of priority associated with scanning channels associated with the set of neighbor cells). Accordingly, during a cell search procedure, the UE 120 may monitor for and/or measure SSBs 315 that are associated with one or more neighbor cells identified in the neighbor cell list. The UE 120 may measure the SSBs 315 during a time window that the UE 120 is not transmitting or receiving data via the cellular network, which is also referred to as a measurement gap. During a measurement gap, service between the UE 120 and a serving cell is disrupted, which may result in increased data transfer latencies and/or reduced data throughput at the UE.

The length of an SMTC window and/or measurement gap associated with measuring the SSBs 315 may be based at least in part on a time span, duration, and/or symbol length of the SSBs. For instance, and as shown by FIG. 3, a duration of an SSB 315 may be based at least in part on the consecutive symbols associated with the PSS 320, the SSS 325, and the PBCHs 330. Although the duration of the SSB 315 may be based at least in part on the entirety of consecutive symbols included in the SSB 315, the UE 120 may measure only a portion of the SSB 315. For example, the UE 120 may generate measurements based at least in part on the SSS 325 and/or the PBCHs 330, and not the PSS 320. Accordingly, although the PSS 320 is included in the SSB 315 and contributes to a length of the SMTC window and/or measurement gap, the UE 120 may not measure the PSS 320. That is, the inclusion of the PSS 320 within each SSB 315 may increase a latency associated with the SMTC window and/or measurement gap and increase a duration of service disruption at the UE 120.

In some aspects, the duration of the SMTC window and/or measurement gap may increase proportionally with an increase in frequency. To illustrate, and as shown by FIG. 3, an SS burst 310 may include multiple SSBs 315, and each SSB 315 may be associated with a different transmit beam. A number of SSBs 315 included within an SS burst 310 may increase proportionally with an increase in a carrier frequency, resulting in an increase in the measurement gap duration and, subsequently, an increase in duration of disruption in service at the UE 120. An increased duration of disruption in service at the UE 120 may result in decreased data throughput and/or increased data transfer latencies.

Some techniques and apparatuses described herein provide a PSS burst that is separate from an SSS burst. A network node may transmit, based at least in part on a first transmission, a PSS burst, and the PSS burst may include a first plurality of symbols that are consecutive in the time domain. The network node may transmit, based at least in part on a second transmission that is non-overlapping with the first transmission in the time domain, an SSS burst. The SSS burst may include a second plurality of symbols that are consecutive in the time domain.

A network node transmitting a PSS burst that is separate from an SSS burst may enable a UE to reduce a measurement gap duration and, subsequently, mitigate a duration associated with a disruption to service provided to the UE. To illustrate, the UE may receive the PSS burst during a time span in which the UE may transmit and/or receive communications with a network node. That is, the UE may receive the PSS while the network node provides service to the UE. Alternatively or additionally, separating a PSS transmission from an SSS transmission (e.g., such as a PSS burst that is separate from an SSS burst as described with regard to FIG. 4) may reduce a number of symbols included in an SSS burst (e.g., relative to an SS burst 310), reduce a duration associated with the SSS burst, and, subsequently, reduce a duration of a measurement gap. Reducing the duration of the measurement gap may reduce the disruption in service to the UE, increase data throughput at the UE, and/or reduce data-transfer latencies at the UE.

As indicated above, FIG. 3 is provided as an example. Other examples may differ from what is described with regard to FIG. 3.

Figure 4:
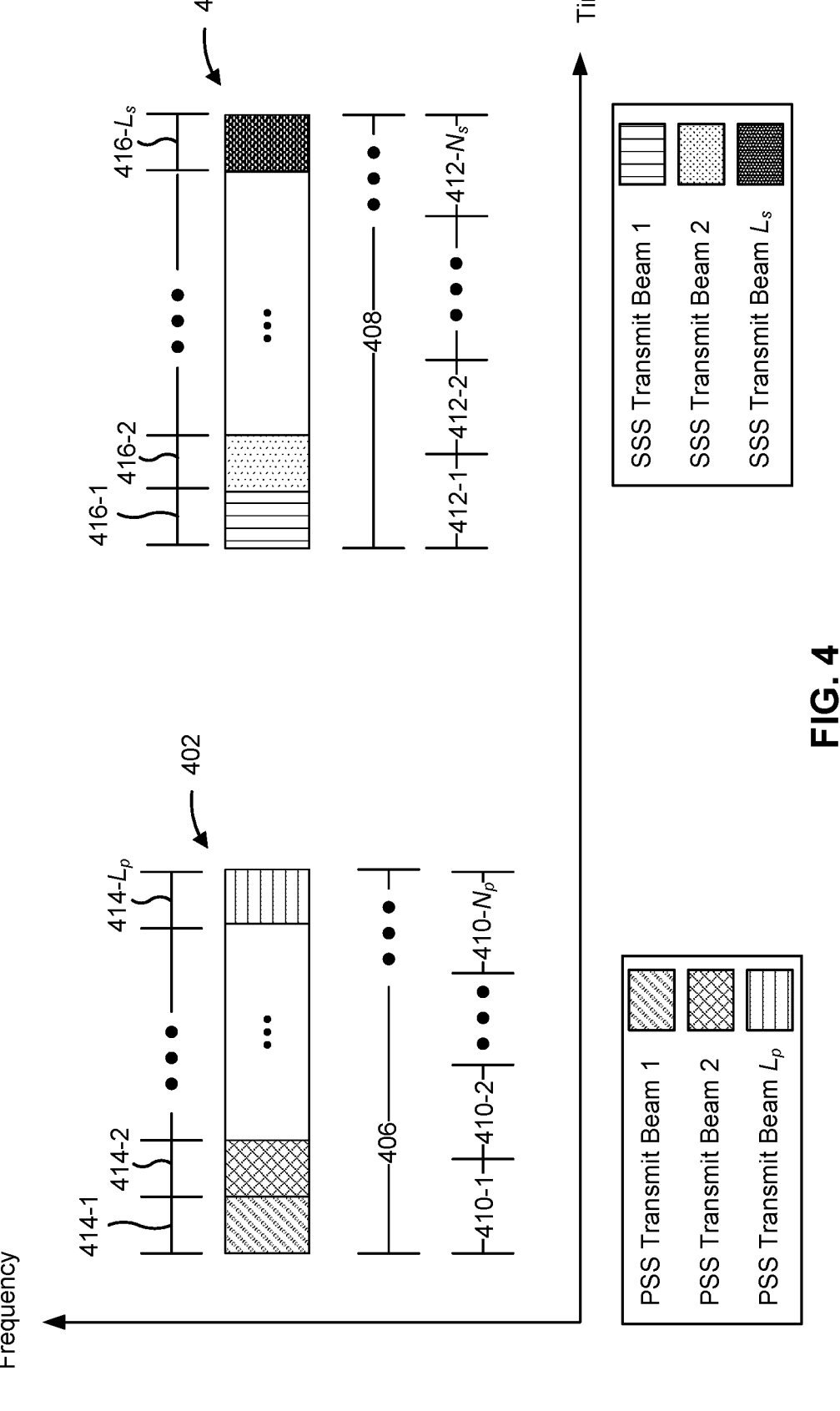
FIG. 4 is a diagram illustrating an example of a primary synchronization signal (PSS) burst and a secondary synchronization signal (SSS) burst, in accordance with the present disclosure.

FIG. 4 is a diagram illustrating an example 400 of a PSS burst 402 and a SSS burst 404, in accordance with the present disclosure. In the example 400, a horizontal axis represents time, and a vertical axis represents frequency. "PSS burst" may denote a transmission that includes one or more PSSs and is void of an SSS. In some aspects, a PSS burst may also be void of a PBCH. "SSS burst" may denote a transmission that includes at least an SSS, may additionally include a PBCH, and is void of a PSS.

A transmitting device, such as a network node 110 and/or a non-serving network node 110, may separate transmission of a PSS and an SSS into at least two transmissions that are non-overlapping with one another, such as a first transmission sion (e.g., the PSS burst 402) and a second transmission (e.g., the SSS burst 404) that are non-overlapping in the time domain. As described above, separating the PSS and the SSS into different transmissions may reduce a measurement gap at a UE and, subsequently, reduce a disruption in service at the UE. In some aspects, the transmitting device may transmit the PSS burst 402 based at least in part on a first periodicity and transmit the SSS burst 404 based at least in part on a second periodicity, where the first periodicity and the second periodicity may be a same periodicity and/or different periodicities. For example, a non-serving network node 110 associated with a UE (e.g., a network node that is not providing the UE with service) may transmit the PSS burst 402 and the SSS burst 404 at a same periodicity or at different periodicities. The PSS burst 402 may indicate at least one cell group identifier (ID) (e.g., associated with the non-serving network node), and the SSS burst 404 may indicate at least one cell ID that is associated with the at least one cell group ID.

The PSS burst 402 may occur over a first duration 406 and the SSS burst 404 may occur over a second duration 408 that is non-overlapping in the time domain with the first duration 406. That is, the first duration 406 and the second duration 408 may occur over different time spans that are non-contiguous, non-overlapping, and/or disjoint (e.g., disconnected, detached, and/or separate). In some aspects, the first duration 406 may span at least $N_p$ time slots (shown as time slot 410-1, time slot 410-2, to time slot 410-$N_p$) and the second duration 408 may occur over at least $N_s$ time slots (shown as time slot 412-1, time slot 412-2, to time slot 412-$N_s$), where $N_p$ and $N_s$ are integers that may be a same value or may be different values. The $N_p$ time slots associated with the PSS burst 402 may be consecutive with one another in the time domain, but non-contiguous, non-overlapping, and/or disjointed in the time domain with the $N_s$ time slots associated with the SSS burst 404. Alternatively or additionally, the $N_s$ time slots associated with the SSS burst 404 may be consecutive with one another in the time domain, but non-contiguous, non-overlapping, and/or disjointed in the time domain with the $N_p$ time slots associated with the PSS burst 402. Accordingly, and as shown by FIG. 4, the $N_p$ time slots associated with the PSS burst 402 may be disjointed in the time domain with the $N_s$ time slots associated with the SSS burst 404.

The PSS burst 402 may include $L_p$ PSS sequence repetitions (e.g., repetitions of a PSS sequence and/or repetitions of a PSS), and the SSS burst 404 may include $L_s$ SSS sequence repetitions (e.g., repetitions of an SSS sequence and/or repetitions of an SSS), where $L_p$ and $L_s$ are integers that may have a same value and/or varying values from one another. In some aspects, a PSS may be a transmission that is based at least in part on a PSS sequence, and an SSS may be a transmission that is based at least in part on an SSS sequence. A PSS sequence may include $M_p$ elements, and an SSS sequence may include $M_s$ elements, where $M_p$ and $M_s$ are integers that may have a same value or varying values from one another. That is, the number of elements included in a PSS sequence (e.g., $M_p$ elements) may be equal to, or different from, the number of elements included in an SSS sequence (e.g., $M_s$ elements). A non-limiting example of a PSS element and/or an SSS element may include a real number or a complex number. In some aspects, a transmitting device (e.g., a network node 110) may encode the elements of the PSS sequence and/or the SSS sequence as one or more symbols associated with a constellation diagram. Accordingly, each repetition of the PSS sequence may be transmitted as one or more symbols and/or each repetition of the SSS sequence may be transmitted as one or more symbols.

The PSS burst 402 may include a first plurality of symbols that are based at least in part on the $L_p$ PSS sequence repetitions, and the SSS burst 404 may include a second plurality of symbols that are based at least in part on the $L_s$ SSS sequence repetitions. The PSS burst symbols (e.g., the first plurality of symbols) may be consecutive and/or contiguous with one another in the time domain, but disjointed from the SSS burst symbols (e.g., the second plurality of symbols) in the time domain. Similarly, the SSS burst symbols may be consecutive and/or contiguous with one another in the time domain, but disjointed with the PSS burst symbols in the time domain. That is, and as described above, the PSS burst may be transmitted during a separate time span than the SSS burst such that no PSS burst symbols are consecutive and/or adjacent in the time domain with the SSS burst symbols.

In some aspects, a transmitting device may transmit the $L_p$ PSS sequence repetitions based at least in part on $L_p$ PSS transmit beams. The transmitting device may alternatively or additionally transmit the $L_s$ SSS sequence repetitions based at least in part on $L_s$ SSS transmit beams. To illustrate, a first PSS sequence repetition may be transmitted over a duration of a first PSS block 414-1, a second PSS sequence repetition may be transmitted over a second duration of a second PSS block 414-2, up to an $L_p$-th PSS sequence repetition in an $L_p$-th PSS block 414-$L_p$. Each PSS sequence repetition (and/or each PSS) may be transmitted based at least in part on a respective PSS transmit beam of the $L_p$ PSS transmit beams. Thus, the first PSS sequence repetition and/or first PSS may be transmitted based at least in part on a first PSS transmit beam (shown with a diagonal line pattern), a second PSS sequence repetition and/or second PSS may be transmitted based at least in part on a second PSS transmit beam (shown with a crisscross hatch pattern), up to the $L_p$-th PSS sequence repetition and/or $L_p$-th PSS being transmitted based at least in part on an $L_p$-th PSS transmit beam (shown with a horizontal strip pattern).

Multiple PSS blocks may span a time slot such that multiple PSS transmit beams and multiple PSS sequence repetitions may be transmitted (e.g., by the transmitting device) in a same and/or single time slot. To illustrate, the transmitting device may transmit at least the first PSS sequence repetition in the time slot 410-1 based at least in part on the first PSS transmit beam as described above, and transmit at least a second PSS sequence repetition in the same time slot using a second PSS transmit beam. Although described as transmitting two PSS sequence repetitions using two PSS transmit beams in a single time slot, other examples may include transmitting more or fewer PSS sequence repetitions in a single time slot based at least in part on more or fewer PSS transmit beams.

Similarly, the transmitting device may transmit a first SSS sequence repetition and/or first SSS during a first SSS block 416-1 based at least in part on using a first SSS transmit beam (shown with a horizontal line pattern). Alternatively or additionally, the transmitting device may transmit a second SSS sequence repetition and/or second SSS during a second SSS block 416-2 based at least in part on using a second SSS transmit beam (shown with a light dotted pattern), up to an $L_s$-th SSS sequence repetition and/or $L_s$-th SSS during an $L_s$-th SSS block 416-$L_s$ based at least in part on an $L_s$-th SSS transmit beam (shown with a heavy dotted pattern). In some aspects, and as further described with regard to FIGS. 5-8, the transmitting device may transmit a PBCH during at least a portion of an SSS block (e.g., based at least in part on a PBCH beam). Multiple SSS blocks may span a single time slot such that multiple SSS transmit beams may be transmitted in the single time slot.

A PSS transmit beam may have different characteristics from an SSS transmit beam. As one example, the PSS transmit beam may have a first beam width, and the SSS transmit beam may have a second (different) beam width. However, in other examples, the first beam width and the second beam width may be commensurate (e.g., equal, within a range of values, and/or within a threshold) with one another. Alternatively or additionally, the PSS transmit beam may be associated with a first transmission channel indicator (TCI) state and the SSS beam may be associated with a second (different) TCI state or the (same) first TCI state. In some aspects, the transmitting device may select the first beam width for a PSS transmit beam based at least in part on a number of PSS sequence repetitions and/or a number of PSS transmit beams (e.g., $L_p$) associated with the PSS burst 402. Similarly, the transmitting device may select the second beam width for an SSS transmit beam based at least in part on a number of SSS sequence repetitions and/or a number of SSS transmit beams associated with the SSS burst 404. To illustrate, for $L_p=4$, the transmitting device (e.g., the non-serving network node) may select a 90-degree horizontal beam width for each PSS transmit beam (and varying directions) such that the combined four PSS transmit beams cover 360 degrees of a horizontal plane. For $L_s=8$, the transmitting device may select a 45-degree horizontal beam width for each SSS transmit beam (and varying directions) such that the combined eight SSS transmit beams cover 360 degrees of the horizontal plane. Accordingly, the non-serving network node may select a wider beam width for a PSS burst and/or SSS burst that includes fewer sequence repetitions and a narrower beam width for a PSS burst and/or SSS burst that includes more sequence repetitions.

The PSS burst 402 may occupy a first bandwidth and the SSS burst 404 may occupy a second bandwidth. The first bandwidth and the second bandwidth may have a same bandwidth size or different bandwidth sizes. Alternatively or additionally, the first bandwidth and the second bandwidth may have a same center frequency or different center frequencies. A transmitting device may transmit the PSS burst 402 and/or a PSS sequence at a first power level. Accordingly, the transmitting device may select the first power level based at least in part on a desired power level for the PSS sequence transmission (e.g., the PSS). In some aspects, the transmitting device may transmit the SSS burst 404 and/or an SSS sequence at the first power level, while in other aspects, the transmitting device may transmit the SSS burst 404 and/or the SSS sequence at a second (different) power level. Alternatively or additionally, the transmitting device may transmit the PSS burst 402 and/or a PSS sequence based at least in part on a first waveform, and may transmit the SSS burst 404 and/or the SSS sequence based at least in part on the (same) first waveform, or a second, different waveform.

A network node transmitting a PSS burst that is separate from an SSS burst may enable a UE to reduce a measurement gap duration and, subsequently, mitigate a duration associated with a disruption to service provided to the UE. Reducing the disruption in service to the UE may increase data throughput at the UE and/or reduce data-transfer latencies at the UE.

As indicated above, FIG. 4 is provided as an example. Other examples may differ from what is described with regard to FIG. 4.

Figure 5:
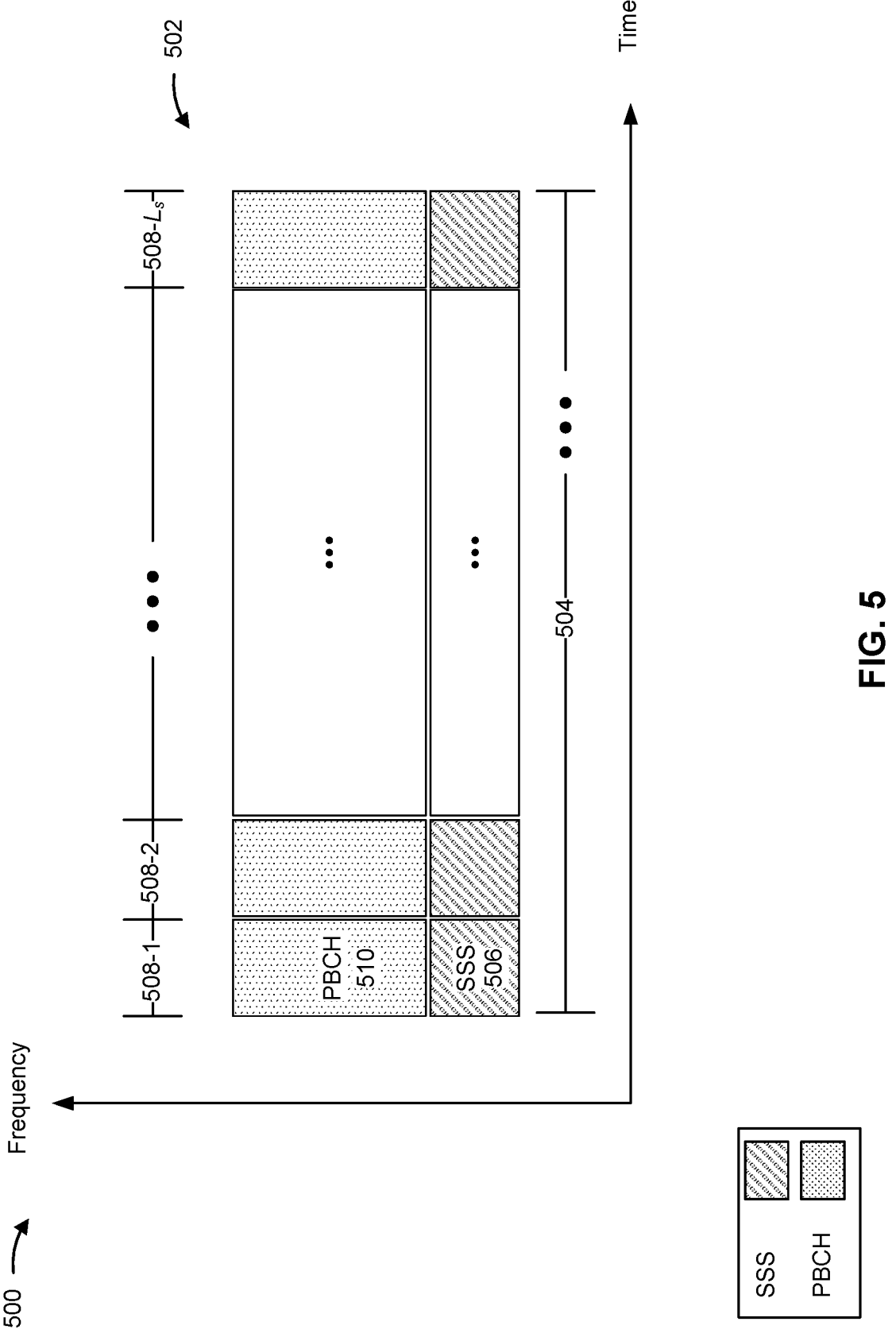
FIG. 5 is a diagram illustrating an example of an SSS burst that includes a physical broadcast channel (PBCH), in accordance with the present disclosure.

FIG. 5 is a diagram illustrating an example 500 of an SSS burst 502 that includes PBCH, in accordance with the present disclosure. In the example 500, a horizontal axis represents time, and a vertical axis represents frequency.

The SSS burst 502 may span a duration 504, and each SSS sequence repetition (e.g., of $L_s$SSS sequence repetitions) may occupy a respective SSS block. For example, a transmitting device (e.g., a network node 110 and/or a non-serving network node 110) may transmit a first SSS sequence repetition 506 and/or first SSS (shown with a diagonal pattern) in a first SSS block 508-1. The transmitting device may transmit the first SSS sequence repetition 506 based at least in part on a first SSS transmit beam. In some aspects, the transmitting device may transmit a PBCH 510 (shown with a dotted pattern) in the SSS block 508-1 based at least in part on multiplexing the first SSS sequence repetition 506 and the PBCH 510 in the frequency domain. Accordingly, the first SSS sequence repetition 506 and the PBCH 510 may occupy the same symbol duration(s) of the SSS block 508-1. The multiplexing in the frequency domain may repeat for the duration of the SSS burst 502 as shown by a second SSS block 508-2 up to an $L_s$-th SSS block 508-$L_s$. Each SSS sequence repetition may be transmitted based at least in part on a respective SSS transmit beam. Accordingly, the transmitting device may transmit (e.g., in each SSS block of the SSS burst) an SSS sequence repetition and a repetition of the PBCH(s).

The transmitting device may transmit the PBCH 510 based at least in part on a PBCH transmit beam. In at least one example, the PBCH transmit beam may be quasi-co-located (QCL) with an SSS transmit beam associated with the first SSS sequence repetition 506. Alternatively or additionally, the PBCH may include a DMRS that is QCL with the SSS (e.g., the transmission associated with the SSS sequence repetition). In some aspects, the transmitting device may transmit the PBCH 510 based at least in part on the SSS transmit beam, such as by using a same beam to transmit an SSS sequence repetition and a PBCH, and/or selecting a characteristic for the PBCH transmit beam based at least in part on a characteristic of an SSS transmit beam (e.g., direction, width, and/or spatial relationship). Accordingly, the transmitting device may transmit each SSS sequence repetition based at least in part on a respective SSS transmit beam and a PBCH repetition based at least in part on a respective PBCH transmit beam that may be associated with the respective SSS transmit beam.

By multiplexing the PBCH in the frequency domain with an SSS (e.g., an SSS sequence repetition), a transmitting device may reduce a measurement gap duration associated with an SSS burst and, subsequently, mitigate a duration associated with a disruption to service provided to the UE. Reducing the disruption in service to the UE may increase data throughput at the UE and/or reduce data-transfer latencies at the UE.

As indicated above, FIG. 5 is provided as an example. Other examples may differ from what is described with regard to FIG. 5.

Figure 6:
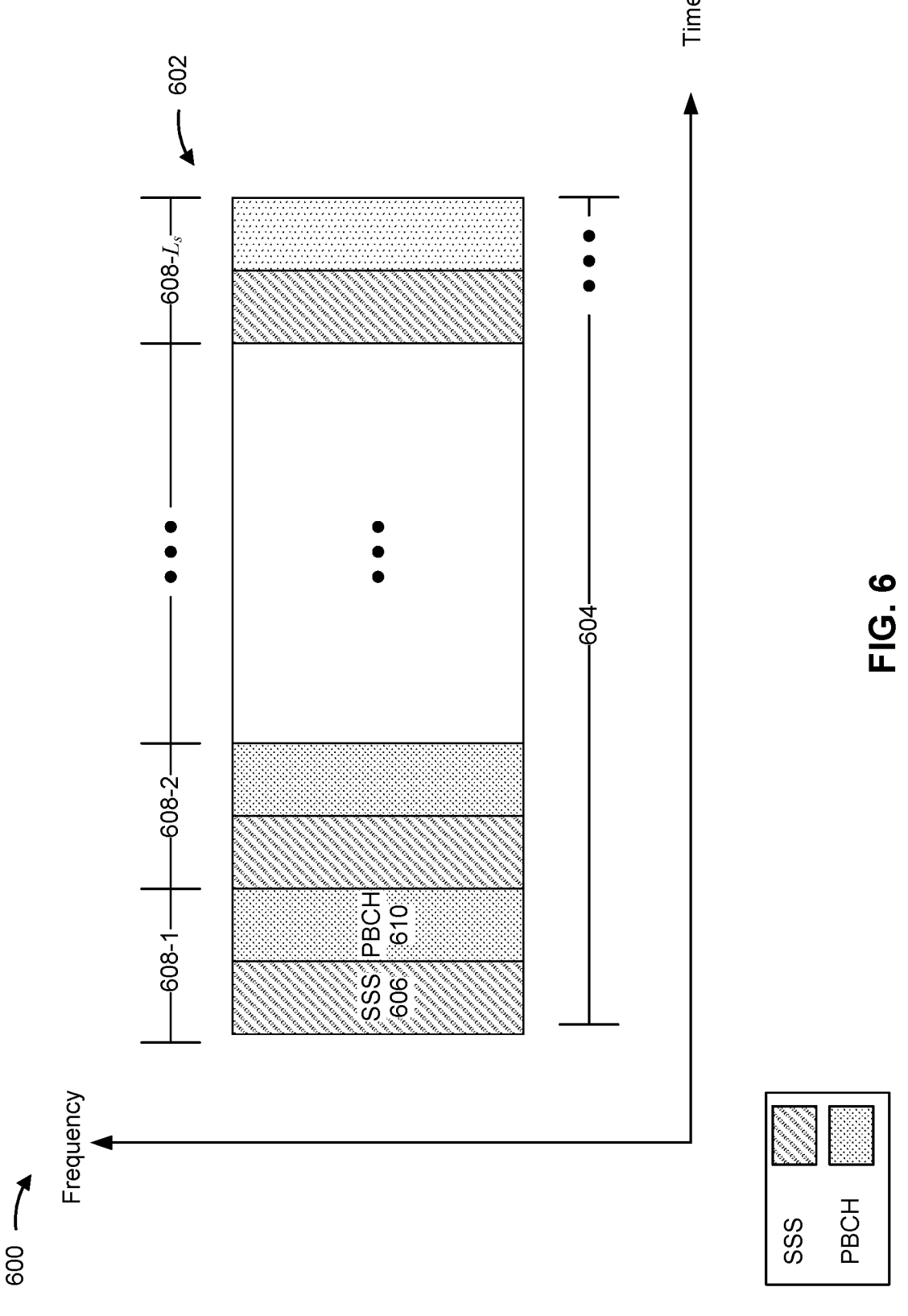
FIG. 6 is a diagram illustrating an example of an SSS burst that includes a PBCH, in accordance with the present disclosure.

FIG. 6 is a diagram illustrating an example 600 of an SSS burst 602 that includes a PBCH, in accordance with the present disclosure. In the example 600, a horizontal axis represents time, and a vertical axis represents frequency.

The SSS burst 602 may span a duration 604, and each SSS sequence repetition (e.g., of $L_s$SSS sequence repetitions) may occupy at least a portion of a respective SSS block. For example, a transmitting device (e.g., a network node 110 and/or a non-serving network node 110) may transmit a first SSS sequence repetition 606 (shown as SSS and using a diagonal pattern) of the SSS burst 602 in a first portion of a first SSS block 608-1 based at least in part on a first SSS transmit beam. Alternatively or additionally, the transmitting device may transmit a PBCH 610 (shown with a dotted pattern) based at least in part on a second portion of the SSS block 608 and a first PBCH transmit beam. For example, the first SSS sequence repetition 606 may occupy one or more symbols of the SSS block 608, and the PBCH 610 may occupy one or more additional symbols of the SSS block 608 based at least in part on the transmitting device multiplexing the first SSS sequence repetition 606 and the PBCH 610 in the time domain. As shown by FIG. 6, the multiplexing in the time domain may repeat for the duration of the SSS burst 602. Accordingly, the transmitting device may transmit in each SSS block of the SSS burst (shown as a second SSS block 608-2 up to $L_s$-th SSS block 608-$L_s$) a respective SSS sequence repetition and a respective PBCH repetition. The transmitting device may transmit each SSS sequence repetition based at least in part on a respective SSS transmit beam and each PBCH repetition based at least in part on a PBCH transmit beam. An SSS sequence repetition and a PBCH repetition may occupy a same frequency bandwidth or occupy bandwidths that are different from one another.

By multiplexing the PBCH in the time domain with an SSS (e.g., an SSS sequence repetition), a transmitting device may initially perform channel estimation based at least in part on the SSS, and use the channel estimation to improve decoding of the PBCH (e.g., reduce recovery errors). Transmitting an SSS burst that is separate from a PSS burst and/or void of a PSS, such as described by the example 600, may enable a UE to reduce a measurement gap duration and, subsequently, mitigate a duration associated with a disruption to service provided to the UE. Reducing the disruption in service to the UE may increase data throughput at the UE and/or reduce data-transfer latencies at the UE.

As indicated above, FIG. 6 is provided as an example. Other examples may differ from what is described with regard to FIG. 6.

Figure 7:
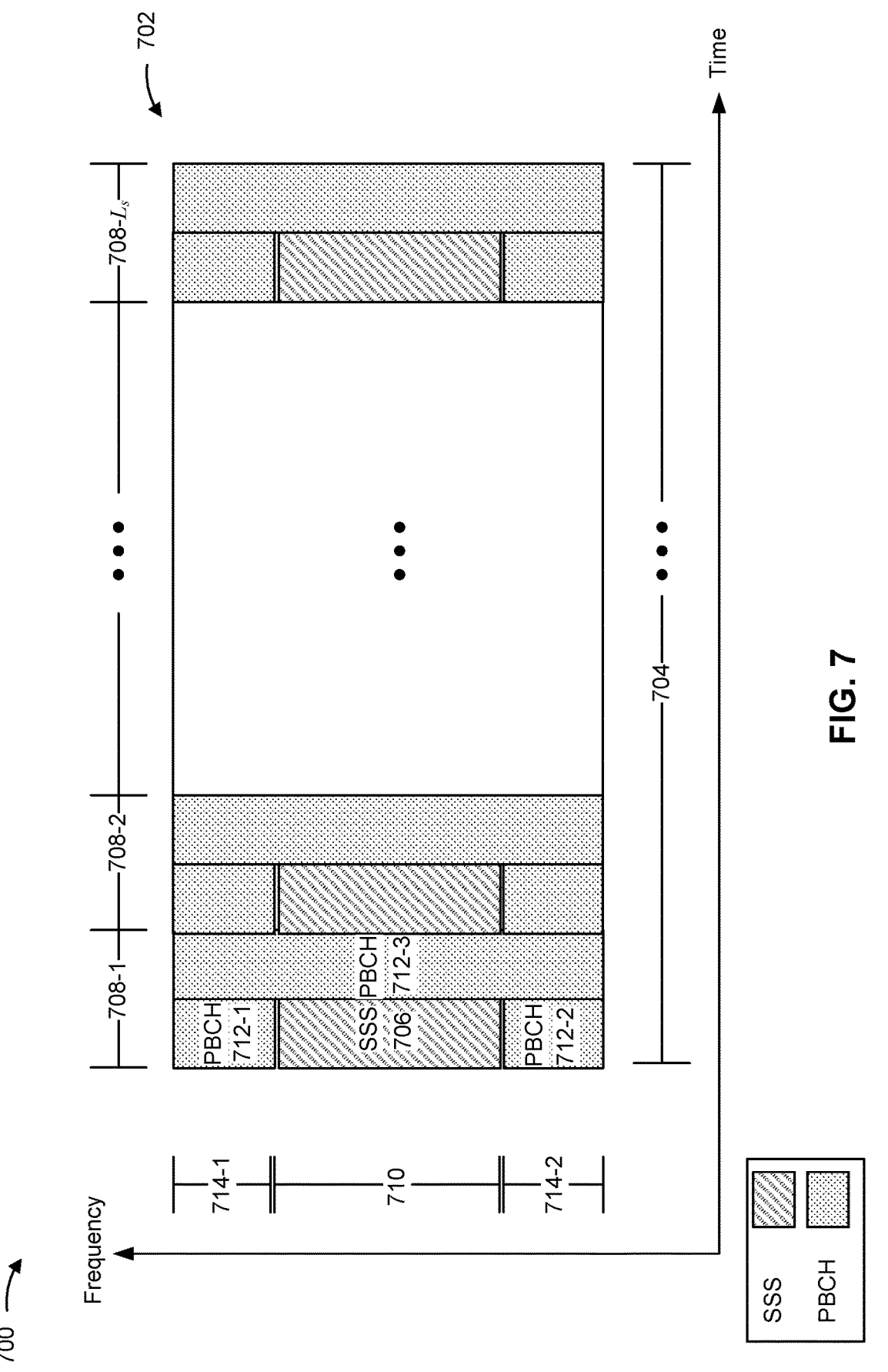
FIG. 7 is a diagram illustrating an example of an SSS burst that includes a PBCH, in accordance with the present disclosure.

FIG. 7 is a diagram illustrating an example 700 of an SSS burst 702 that includes a PBCH, in accordance with the present disclosure. In the example 700, a horizontal axis represents time, and a vertical axis represents frequency.

The SSS burst 702 may span a duration 704, and a transmitting device (e.g., a network node 110 and/or a non-serving network node 110) may configure each SSS sequence repetition (e.g., of $L_s$SSS sequence repetitions) to occupy at least a first portion of a respective SSS block. Alternatively or additionally, the transmitting device may configure a PBCH to occupy a second portion of the respective SSS block. For example, the transmitting device may multiplex an SSS sequence repetition with a PBCH in the frequency domain and the time domain. To illustrate, an SSS sequence repetition 706 (shown as SSS and using a diagonal pattern) may occupy a first portion of a first SSS block 708-1 based at least in part on a first frequency bandwidth 710. During a same portion of the first SSS block 708-1 (e.g., during a same time span and/or during a same symbol duration), at least a portion of a PBCH (shown as PBCH 712-1 and PBCH 712-2 with a dotted pattern) may occupy a second frequency bandwidth 714-1 and/or a third frequency bandwidth 714-2. During a second portion of the first SSS block 708-1, the transmitting device may transmit a third portion of the PBCH (shown as PBCH 712-3 with a dotted pattern) that occupies the first frequency bandwidth 710, the second frequency bandwidth 714-1, and the third frequency bandwidth 714-2. As described with regard to FIGS. 4-6, the transmitting device may transmit the SSS sequence repetition 706 based at least in part on an SSS transmit beam, and the PBCH 714-1 and the PBCH 714-2 based at least in part on a PBCH beam and/or the SSS beam. The multiplexing in the time domain and frequency domain may repeat for the duration of the SSS burst 702. To illustrate, and as shown by FIG. 7, the multiplexing of an SSS sequence repetition with a PBCH repetition in the time domain and frequency domain repeats in a second SSS block 708-2 up to an $L_s$-th SSS block 708-$L_s$.

By multiplexing the PBCH in the frequency domain and the time domain with an SSS (e.g., an SSS sequence repetition transmission) as shown by FIG. 7, a transmitting device may increase a payload of information carried by the PBCH (e.g., relative to the example 500 and/or the example 600) without increasing a time duration of an SSS block (e.g., by adding more symbols) and, subsequently, an SSS burst. Transmitting an SSS burst that is separate from a PSS burst, such as described by the example 700, may alternatively or additionally enable a UE to reduce a measurement gap duration and, subsequently, mitigate a duration associated with a disruption to service provided to the UE. Reducing the disruption in service to the UE may increase data throughput at the UE and/or reduce data-transfer latencies at the UE.

As indicated above, FIG. 7 is provided as an example. Other examples may differ from what is described with regard to FIG. 7.

Figure 8:
FIG. 8 is a diagram illustrating an example of an SSS burst that includes a PBCH, in accordance with the present disclosure.

FIG. 8 is a diagram illustrating an example 800 of an SSS burst 802 that includes a PBCH, in accordance with the present disclosure. In the example 800, a horizontal axis represents time, and a vertical axis represents frequency.

The SSS burst 802 may span a duration 804 and include multiple SSS sequence repetitions (e.g., $L_s$SSS sequence repetitions). Alternatively or additionally, the SSS burst 802 may include multiple PBCH repetitions. For example, a transmitting device (e.g., a network node 110 and/or a non-serving network node 110) may multiplex an SSS sequence repetition with a PBCH in the frequency domain and the time domain as shown by FIG. 8. In the example 800, at least a portion of a first SSS sequence repetition (shown with a diagonal pattern and as SSS 806-1, SSS 806-2, up to SSS 806-$n$, where n is an integer) and at least a portion of a first PBCH repetition (shown with a dotted pattern and as PBCH 808-1, PBCH 808-2, up to PBCH 808-$m$, where m is an integer) may be interlaced with one another in the frequency domain in a first portion of a first SSS block 810-1. That is, the first SSS sequence repetition and the first PBCH repetition may be interlaced in the frequency domain during a first time span and/or one or more symbol durations associated with the first SSS block 810-1. Alternatively or additionally, the first SSS sequence repetition and the first PBCH repetition may be interlaced with one another in the time domain as shown by PBCH 812-1 up to PBCH 812-2 that occupies a second portion of the first SSS block 810-1 (e.g., during a second time span and/or one or more additional symbol durations associated with the first SSS block 810-1). The multiplexing and/or interlacing of an SSS sequence repetition with a PBCH repetition in the time domain and frequency domain may repeat for the duration of the SSS burst 802. To illustrate, and as shown by FIG. 8, the multiplexing and/or interlacing of an SSS sequence repetition with a PBCH repetition repeats in a second SSS block 810-2, up to an $L_s$-th SSS block 810-$L_s$.

By multiplexing the PBCH in the time domain with an SSS, a transmitting device may use the SSS for measurement timing information to improve decoding of the PBCH (e.g., reduce recovery errors). For example, a DMRS transmitted by the PBCH may not provide enough information to recover the PBCH payload reliability (e.g., below a threshold of recovery errors). In such a scenario, a UE may recover timing information based at least in part on the SSS, and improve data recovery (e.g., reduce recovery errors) from the PBCH payload. Transmitting an SSS burst that is separate from a PSS burst, such as described by the example 800, may alternatively or additionally enable a UE to reduce a measurement gap duration and, subsequently, mitigate a duration associated with a disruption to service provided to the UE. Reducing the disruption in service to the UE may increase data throughput at the UE and/or reduce data-transfer latencies at the UE.

As indicated above, FIG. 8 is provided as an example. Other examples may differ from what is described with regard to FIG. 8.

Figure 9:
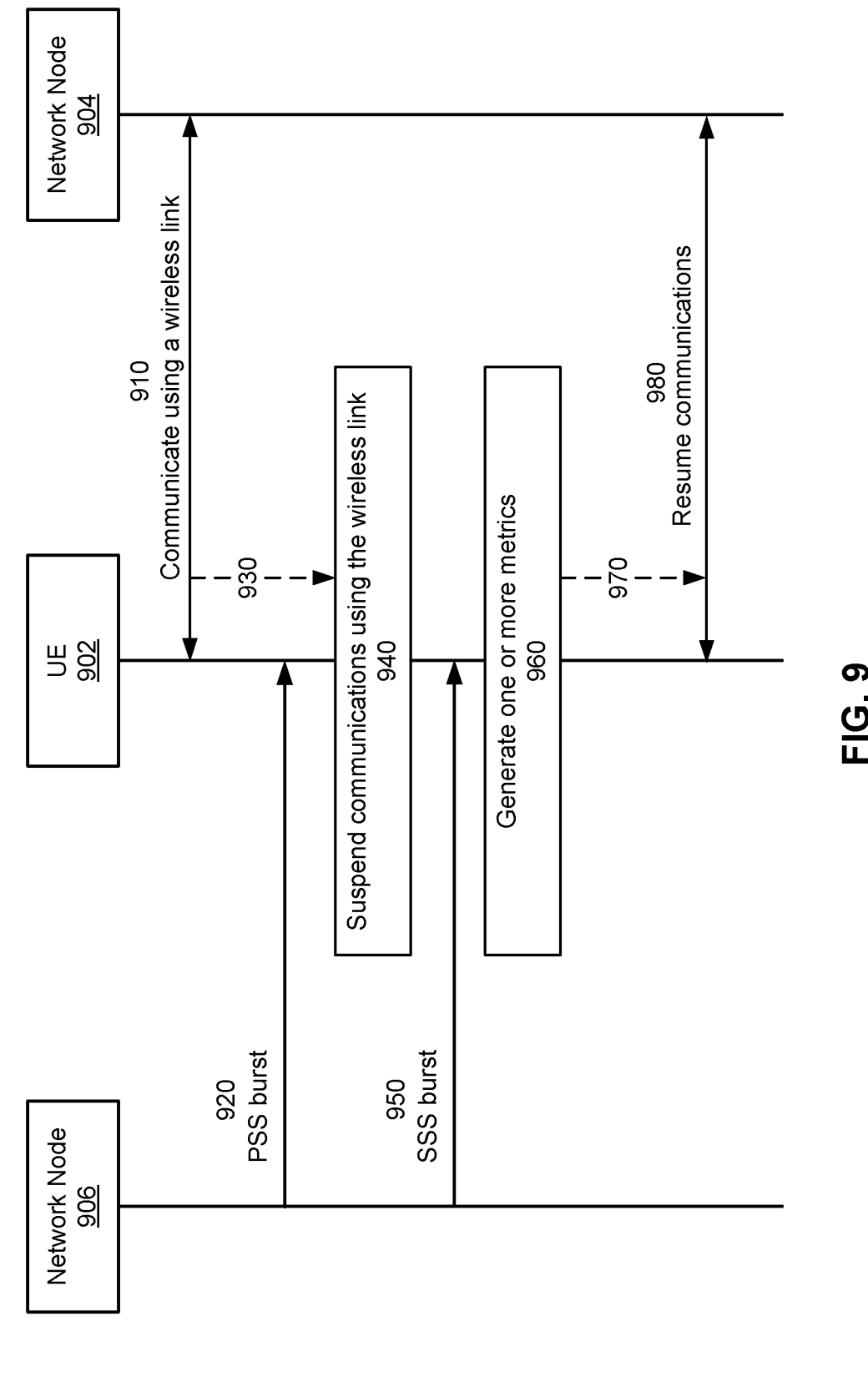
FIG. 9 is a diagram illustrating an example of a wireless communication process between a UE, a serving network node, and a non-serving network node, in accordance with the present disclosure.

FIG. 9 is a diagram illustrating an example 900 of a wireless communication process between a UE 902 (e.g., the UE 120), a serving network node 904 (e.g., a network node 110), and a non-serving network node 906 (e.g., another network node 110), in accordance with the present disclosure.

As shown by reference number 910, a UE 902 and a serving network node 904 associated with the UE 902 may communicate with one another based at least in part on using a wireless link. To illustrate, the serving network node 904 may provide the UE 902 with access to a wireless network based at least in part on establishing the wireless link. In some aspects, the serving network node 904 may transmit, and the UE 902 may receive, a downlink communication based at least in part on the wireless link. Alternatively or additionally, the UE 902 may transmit, and the serving network node 904 may receive, an uplink communication.

As shown by reference number 920, a non-serving network node 906 (e.g., a network node that is not actively serving the UE 902) may transmit, and the UE 902 may receive, a PSS burst. While a non-serving network node transmits the PSS burst in the example 900, other examples may include a serving network node (e.g., the serving network node 904) transmitting the PSS burst. In some aspects, the UE 902 may not be connected to non-serving network node 906, and the non-serving network node 906 may broadcast the PSS burst based at least in part on multiple PSS transmit beams that have different transmission directions. Accordingly, the UE 902 may receive a portion of the PSS burst (e.g., instead of an entirety of the PSS burst) based at least in part on the different transmission directions of the PSS transmit beams. That is, some of the transmission directions of the PSS transmit beams may propagate away from the UE 902.

In some aspects, and as shown by reference number 930, the UE 902 and the serving network node 904 may continue to communicate using the wireless link while the non-serving network node 906 transmits the PSS burst and/or the UE 902 receives at least a portion of the PSS burst. That is, the UE 902 may maintain communications with the serving network node 904 during reception of at least a portion of the PSS burst. In some aspects, the PSS burst may include at least two PSS sequence repetitions that are transmitted in a same time slot. To illustrate, the non-serving network node 906 may transmit at least a portion of a first PSS sequence repetition in a single time slot based at least in part on using a first PSS transmit beam, and transmit at least a portion of a second PSS sequence repetition in the single time slot based at least in part on using a second (different) PSS transmit beam. Each PSS sequence repetition within the PSS burst may indicate a cell group ID.

As shown by reference number 940, the UE 902 may (temporarily) suspend communications with the serving network node 904. Alternatively or additionally, and as shown by reference number 950, the non-serving network node 906 may transmit an SSS burst, and the UE 902 may suspend the communications based at least in part on a scheduled arrival of the SSS burst and/or a monitoring time window associated with the SSS burst. In some aspects, the non-serving network node 906 may transmit the SSS burst based at least in part on transmitting at least two SSS sequence repetitions in a same time slot. To illustrate, the non-serving network node 906 may transmit at least a portion of a first SSS sequence repetition in a single time slot based at least in part on using a first SSS transmit beam, and transmit at least a portion of a second SSS sequence repetition in the single time slot based at least in part on using a second (different) SSS transmit beam. While the non-serving network node 906 transmits the SSS burst in the example 900, other examples may include the serving network node 904 transmitting the SSS burst.

In some aspects, the UE 902 may suspend the communications with the serving network node 904 for an entire duration of the SSS burst, while in other aspects, the UE 902 may suspend the communications during a portion of the SSS burst. For example, the UE 902 may successfully receive an SSS sequence repetition, such as by receiving an SSS with an RSSI that satisfies a power threshold, and suspend and/or cease monitoring for (and/or receiving) a remaining portion of the SSS burst. In some aspects, the UE 902 may configure a measurement gap based at least in part on an entire duration of the SSS burst and/or a monitoring window associated with the SSS burst. In some aspects, a network node (e.g., a network node 110) may indicate a duration of the measurement gap to the UE 902, such as by indicating a number of SSS repetitions, a number of carrier frequencies associated with the SSS burst, and/or a number of frequency bands associated with the SSS burst.

The SSS burst transmitted by the non-serving network node 906 may include an SSS (e.g., an SSS sequence repetition) and at least one PBCH. As one example, and as described with regard to FIG. 5, the SSS and the PBCH may be multiplexed in the frequency domain for the duration of an SSB block. Alternatively or additionally, as described with regard to FIG. 6, the SSS and the PBCH may be multiplexed in the time domain based at least in part on the duration of the SSS block, such as by the non-serving network node 906 transmitting the SSS in a first time partition of the SSS block and the PBCH in a second time partition of the SSS block. In some aspects, the non-serving network node 906 may transmit the SSS burst based at least in part on multiplexing the SSS and the PBCH in the frequency domain and the time domain over a duration of the SSS block, such as described with regard to FIG. 7 and/or FIG. 8.

As part of transmitting an SSS burst, the non-serving network node 906 may transmit an SSS and/or an SSS sequence repetition based at least in part on an SSS transmit beam. The SSS transmit beam may have a wider beam width, same beam width, and/or narrower beam width relative to a PSS transmit beam. In some aspects, the non-serving network node 906 may transmit an SSS sequence repetition based at least in part on an SSS transmit beam and a PBCH based at least in part on a PBCH beam. The SSS transmit beam and the PBCH transmit beam may be QCL. Alternatively, or additionally, the PBCH transmit beam and the SSS transmit beam may be associated with each other, such as by having a same spatial relationship and/or beam width. The PBCH may include a DMRS that is QCL with the at least one SSS.

As shown by reference number 960, the UE 902 may generate one or more metrics based at least in part on the SSS burst. Alternatively or additionally, the UE 902 may recover information from an SSS sequence repetition and/or a payload of a PBCH. As one example, the SSS burst may be void of a PSS, and the UE 902 may recover a cell ID without using the PSS burst. To illustrate, a pool size of valid SSS sequence repetitions included in the SSS burst may be equal to a number of valid cell IDs such that there is a one-to-one mapping from an SSS sequence to a cell ID. As another example, a cell ID may be jointly indicated by an SSS sequence and a DMRS sequence of an associated PBCH. Alternatively or additionally, the UE 902 may generate a Layer 1 (L1) measurement metric (e.g., L1 RSRP and/or L1 RSSI) and/or a Layer 3 (L3) measurement metric (e.g., L3 RSRP and/or L3 RSSI) based at least in part on the SSS burst (e.g., when the SSS burst is void of a PSS). To illustrate, the UE 902 may generate the L1 measurement metric based at least in part on the SSS sequence repetition. Alternatively or additionally, the UE 902 may generate the L1 measurement metric or the L3 measurement metric based at least in part on the PBCH, such as when the PBCH includes a DMRS. In some aspects, the UE 902 may generate one or more channel estimation measurement metrics based at least in part on the SSS sequence repetition, and recover information from the PBCH based at least in part on using the channel estimation measurement metric(s).

In some aspects, the UE 902 may derive at least one spatial relationship for one or more communication channels (e.g., a downlink communication channel and/or an uplink communication) associated with a TCI state based at least in part on using a PSS included in the PSS burst as a reference signal and/or using an SSS included in the SSS burst. That is, the UE may measure the PSS and/or SSS as a reference signal to generate information about the spatial relationship. For example, based at least in part on generating one or more measurement metrics for SSS sequence(s) and/or PBCH(s) (e.g., that includes a DMRS included) on different beams, the UE 902 may identify one or more beams within the SSS burst that are associated with the highest measurement metric(s) (e.g., an RSRP metric, an RSRQ metric, a signal-to-noise (SNR) metric, and/or a signal-to-noise-plus-interference ratio (SINR) metric) and use the beam(s) associated with the highest measurement metrics for a subsequent reception (e.g., a downlink transmission) and/or a subsequent transmission (e.g., an uplink transmission). Alternatively, or additionally, the UE 902 may form one or more beams for the one or more communication channels based at least in part on the spatial relationship. To illustrate, the UE 902 may communicate with a network node or another device (e.g., using the communication channel) based at least in part on beamforming and/or a QCL transmission based at least in part on the TCI state. For instance, the UE 902 may reuse a receive beam associated with receiving a PSS (e.g., via the PSS burst) and/or an SSS (e.g., via the SSS burst) to receive another downlink transmission on a first channel that shares a same QCL and/or TCI state as the PSS and/or SSS. Alternatively, or additionally, the UE 902 may transmit an uplink signal based at least in part on using a transmit beam on a second channel that is related (e.g., based on communication channel reciprocity) to the QCL and/or TCI state of the receive beam used to receive the PSS and/or SSS.

As shown by reference number 970 and reference number 980, the UE 902 may resume communications with the serving network node 904 after reception of at least a portion of the SSS burst. That is, the UE 902 may resume communicating with the serving network node 904 based at least in part on successfully receiving an SSS sequence repetition and/or a PBCH included in the SSS burst. For example, and as described above, the UE 902 may resume communicating with the serving network node 904 after receiving an SSS with an RSSI that satisfies a power threshold. Alternatively or additionally, the UE 902 may resume communicating with the serving network node 904 after recovering data from a payload of the PBCH with a number of recovery errors that satisfy an error tolerance threshold. In some aspects, the UE 902 may resume communicating with the serving network node 904 after expiration of a measurement gap and/or monitoring window associated with a duration of the SSS burst.

A network node transmitting a PSS burst that is separate from an SSS burst may enable a UE to reduce a measurement gap duration. Reducing the measurement gap duration may reduce a disruption in service to the UE, increase data throughput at the UE, and/or reduce data-transfer latencies at the UE.

As indicated above, FIG. 9 is provided as an example. Other examples may differ from what is described with regard to FIG. 9.

Figure 10:
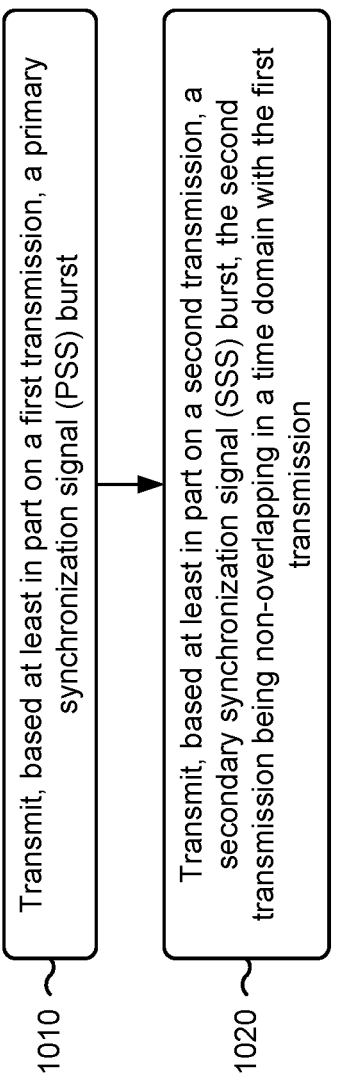
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with a PSS burst that is separate from an SSS burst.

As shown in FIG. 10, in some aspects, process 1000 may include transmitting, based at least in part on a first transmission, a PSS burst (block 1010). For example, the network node (e.g., using transmission component 1204 and/or communication manager 1206, depicted in FIG. 12) may transmit, based at least in part on a first transmission, a PSS burst, as described above.

As further shown in FIG. 10, in some aspects, process 1000 may include transmitting, based at least in part on a second transmission, an SSS burst, the second transmission being non-overlapping in a time domain with the first transmission (block 1020). For example, the network node (e.g., using transmission component 1204 and/or communication manager 1206, depicted in FIG. 12) may transmit, based at least in part on a second transmission, an SSS burst, the second transmission being non-overlapping in a time domain with the first transmission, as described above.

Process 1000 may include additional aspects, such as any single aspect or any combination of aspects described below and/or in connection with one or more other processes described elsewhere herein.

In a first aspect, the PSS burst includes at least one of a first plurality of symbols that are consecutive in the time domain, or a first plurality of time slots that are consecutive in the time domain, the SSS burst includes at least one of a second plurality of symbols that are consecutive in the time domain, or a second plurality of time slots that are consecutive in the time domain, and the PSS burst is non-contiguous with the SSS burst based at least in part on at least one of the first plurality of symbols being disjointed from the second plurality of symbols in the time domain, or the first plurality of time slots being disjointed from the second plurality of time slots in the time domain.

In a second aspect, alone or in combination with the first aspect, transmitting the PSS burst includes transmitting the PSS burst based at least in part on a first periodicity, and transmitting the SSS burst includes transmitting the SSS burst based at least in part on a second periodicity.

In a third aspect, alone or in combination with one or more of the first and second aspects, the first periodicity is different from the second periodicity.

In a fourth aspect, alone or in combination with one or more of the first through third aspects, the first periodicity and the second periodicity are a same periodicity.

In a fifth aspect, alone or in combination with one or more of the first through fourth aspects, the PSS burst includes $L_p$ PSS sequence repetitions, the SSS burst includes $L_s$ SSS sequence repetitions, transmitting the PSS burst includes transmitting the $L_p$ PSS sequence repetitions based at least in part on $L_p$ PSS transmit beams, and transmitting the SSS burst includes transmitting the $L_p$ SSS sequence repetitions based at least in part on $L_s$ SSS transmit beams, where $L_p$ is a first integer and L is a second integer.

In a sixth aspect, alone or in combination with one or more of the first through fifth aspects, transmitting the $L_p$ PSS sequence repetitions includes transmitting a respective PSS sequence repetition of the $L_p$ PSS sequence repetitions based at least in part on a respective PSS transmit beam of the $L_p$ PSS transmit beams, and transmitting the $L_s$ SSS sequences includes transmitting a respective SSS sequence repetition of the $L_s$ SSS sequence repetitions based at least in part on a respective SSS transmit beam of the $L_s$ SSS transmit beams.

In a seventh aspect, alone or in combination with one or more of the first through sixth aspects, transmitting the $L_p$ PSS sequence repetitions includes transmitting the $L_p$ PSS sequence repetitions based at least in part on using $N_p$ time slots, and transmitting the $L_s$ SSS sequence repetitions includes transmitting the $L_s$ SSS sequence repetitions based at least in part on using $N_s$ time slots, where $N_p$ is a third integer and $N_s$ is a fourth integer.

In an eighth aspect, alone or in combination with one or more of the first through seventh aspects, transmitting the $L_p$ PSS sequence repetitions includes transmitting the $L_p$ PSS sequence repetitions based at least in part on transmitting at least two PSS transmit beams in a same time slot of the $N_p$ time slots.

In a ninth aspect, alone or in combination with one or more of the first through eighth aspects, transmitting the $L_p$ PSS sequence repetitions based at least in part on transmitting the at least two PSS transmit beams in the same time slot includes transmitting at least a first PSS sequence repetition of the $L_p$ PSS sequence repetitions in the same time slot using a first PSS transmit beam of the at least two PSS transmit beams, and transmitting at least a second PSS sequence repetition of the $L_p$ PSS sequence repetitions in the same time slot using a second PSS transmit beam of the at least two PSS transmit beams.

In a tenth aspect, alone or in combination with one or more of the first through ninth aspects, transmitting the $L_p$ PSS sequence repetitions based at least in part on $L_p$ PSS transmit beams includes transmitting each PSS transmit beam of the $L_p$ PSS transmit beams based at least in part on a first beam width, and transmitting the $L_s$ SSS sequence repetitions based at least in part on the $L_s$ SSS transmit beams includes transmitting each SSS transmit beam of the $L_s$ SSS transmit beams based at least in part on a second beam width, where the first beam width is wider than the second beam width, and $L_p$ is a different value than $L_s$.

In an eleventh aspect, alone or in combination with one or more of the first through tenth aspects, the PSS burst indicates at least one cell group ID, and the SSS burst indicates at least one cell ID that is associated with the at least one cell group ID.

In a twelfth aspect, alone or in combination with one or more of the first through eleventh aspects, transmitting the SSS burst includes transmitting, in an SSS block of the SSS burst, at least one SSS transmit beam associated with transmitting the SSS burst, and transmitting, in the SSS block of the SSS burst, at least one PBCH based at least in part on a PBCH transmit beam.

In a thirteenth aspect, alone or in combination with one or more of the first through twelfth aspects, the PBCH occupies at least one symbol of the SSS block.

In a fourteenth aspect, alone or in combination with one or more of the first through thirteenth aspects, the SSS transmit beam and the PBCH transmit beam are quasi-co-located.

In a fifteenth aspect, alone or in combination with one or more of the first through fourteenth aspects, transmitting the SSS burst includes transmitting, in an SSS block of the SSS burst, an SSS based at least in part on an SSS transmit beam, and transmitting, in the SSS block of the SSS burst, at least one PBCH based at least in part on the SSS transmit beam.

In a sixteenth aspect, alone or in combination with one or more of the first through fifteenth aspects, the SSS block is a first SSS block in a plurality of SSS blocks associated with the SSS burst, the SSS transmit beam is a first SSS transmit beam in a plurality of SSS transmit beams associated with the SSS burst, and process 1000 includes transmitting, in each respective SSS block of the plurality of SSS blocks SSS burst, a repetition of the SSS based at least in part on a respective SSS transmit beam of the plurality of SSS transmit beams, and transmitting, in the respective SSS block of the SSS burst, a repetition of the at least one PBCH based at least in part on the respective SSS transmit beam.

In a seventeenth aspect, alone or in combination with one or more of the first through sixteenth aspects, transmitting the SSS burst includes transmitting the SSS based at least in part on a beam width and a spatial relationship, and transmitting the at least one PBCH based at least in part on the beam width and the spatial relationship.

In an eighteenth aspect, alone or in combination with one or more of the first through seventeenth aspects, the at least one PBCH includes a DMRS that is quasi-co-located with the at least one SSS.

In a nineteenth aspect, alone or in combination with one or more of the first through eighteenth aspects, transmitting the SSS burst includes transmitting, in an SSS block of the SSS burst, an SSS and a PBCH based at least in part on multiplexing the SSS and the PBCH in a frequency domain.

In a twentieth aspect, alone or in combination with one or more of the first through nineteenth aspects, transmitting the SSS burst includes transmitting, in an SSS block of the SSS burst, an SSS and a PBCH based at least in part on multiplexing the SSS and the PBCH in the time domain.

In a twenty-first aspect, alone or in combination with one or more of the first through twentieth aspects, transmitting the SSS burst includes transmitting, in an SSS block of the SSS burst, an SSS and a PBCH based at least in part on multiplexing the SSS and the PBCH in a frequency domain and the time domain.

In a twenty-second aspect, alone or in combination with one or more of the first through twenty-first aspects, transmitting the SSS burst includes transmitting, in an SSS block of the SSS burst, an SSS and a PBCH based at least in part on interlacing the SSS and the PBCH in a frequency domain and the time domain.

In a twenty-third aspect, alone or in combination with one or more of the first through twenty-second aspects, a PSS sequence of the PSS burst includes $M_p$ elements, and an SSS sequence of the SSS burst includes $M_s$ elements, where $M_p$ is a first integer and $M_s$ is a second integer.

In a twenty-fourth aspect, alone or in combination with one or more of the first through twenty-third aspects, an element includes a real or complex number.

In a twenty-fifth aspect, alone or in combination with one or more of the first through twenty-fourth aspects, $M_p$ is equal to $M_s$.

In a twenty-sixth aspect, alone or in combination with one or more of the first through twenty-fifth aspects, $M_p$ is different from $M_s$.

In a twenty-seventh aspect, alone or in combination with one or more of the first through twenty-sixth aspects, the PSS burst occupies a first bandwidth and the SSS burst occupies a second bandwidth.

In a twenty-eighth aspect, alone or in combination with one or more of the first through twenty-seventh aspects, the first bandwidth and the second bandwidth have at least one of a same bandwidth size, different bandwidth sizes, a same center frequency, or different center frequencies.

In a twenty-ninth aspect, alone or in combination with one or more of the first through twenty-eighth aspects, transmitting the PSS burst includes transmitting a PSS sequence of the PSS burst, transmitting the SSS burst includes transmitting an SSS sequence of the SSS burst, and transmitting the PSS sequence and transmitting the SSS sequence comprise at least one of transmitting the PSS sequence based at least in part on a first beam width and transmitting the SSS sequence based at least in part on the first beam width, transmitting the PSS sequence based at least in part on the first beam width and transmitting the SSS sequence based at least in part on a second beam width, transmitting the PSS sequence based at least in part on a first power level and transmitting the SSS sequence based at least in part on the first power level, transmitting the PSS sequence based at least in part on the first power level and transmitting the SSS sequence based at least in part on a second power level, transmitting the PSS sequence based at least in part on a first waveform and transmitting the SSS sequence based at least in part on the first waveform, or transmitting the PSS sequence based at least in part on the first waveform and transmitting the SSS sequence based at least in part on a second waveform.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
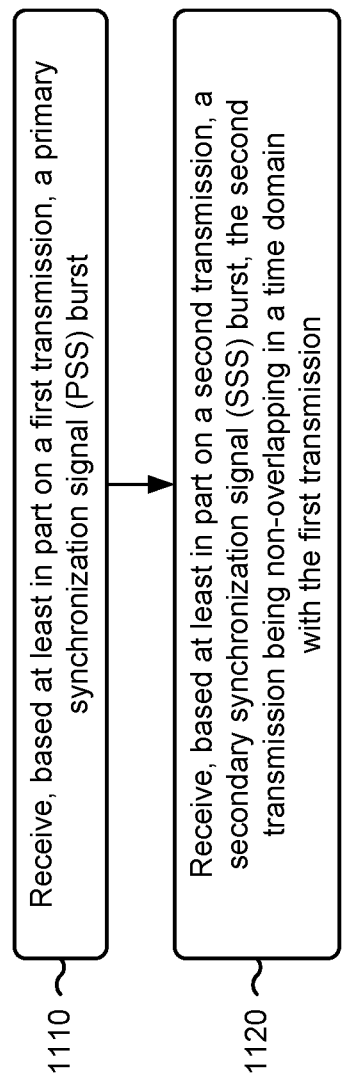
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with a PSS burst that is separate from an SSS burst.

As shown in FIG. 11, in some aspects, process 1100 may include receiving, based at least in part on a first transmission, a PSS burst (block 1110). For example, the UE (e.g., using reception component 1302 and/or communication manager 1306, depicted in FIG. 13) may receive, based at least in part on a first transmission, a PSS burst, as described above.

As further shown in FIG. 11, in some aspects, process 1100 may include receiving, based at least in part on a second transmission, an SSS burst, the second transmission being non-overlapping in a time domain with the first transmission (block 1120). For example, the UE (e.g., using reception component 1302 and/or communication manager 1306, depicted in FIG. 13) may receive, based at least in part on a second transmission, an SSS burst, the second transmission being non-overlapping in a time domain with the first transmission, as described above.

Process 1100 may include additional aspects, such as any single aspect or any combination of aspects described below and/or in connection with one or more other processes described elsewhere herein.

In a first aspect, the PSS burst includes at least one of a first plurality of symbols that are consecutive in the time domain, or a first plurality of time slots that are consecutive in the time domain, the SSS burst includes at least one of a second plurality of symbols that are consecutive in the time domain, or a second plurality of time slots that are consecutive in the time domain, and the PSS burst is non-contiguous with the SSS burst based at least in part on at least one of the first plurality of symbols being disjointed from the second plurality of symbols in the time domain, or the first plurality of time slots being disjointed from the second plurality of time slots in the time domain.

In a second aspect, alone or in combination with the first aspect, receiving the PSS burst includes receiving the PSS burst based at least in part on a first periodicity, and receiving the SSS burst includes receiving the SSS burst based at least in part on a second periodicity.

In a third aspect, alone or in combination with one or more of the first and second aspects, the first periodicity is different from the second periodicity.

In a fourth aspect, alone or in combination with one or more of the first through third aspects, the first periodicity and the second periodicity are a same periodicity.

In a fifth aspect, alone or in combination with one or more of the first through fourth aspects, the SSS burst is void of a PSS, and process 1100 includes recovering, from the SSS burst, a cell ID without using the PSS burst.

In a sixth aspect, alone or in combination with one or more of the first through fifth aspects, the SSS burst is void of a PSS, and process 1100 includes generating, based at least in part on the SSS burst, an L1 measurement metric or an L3 measurement metric.

In a seventh aspect, alone or in combination with one or more of the first through sixth aspects, the SSS burst includes at least one SSS, and generating the L1 measurement metric or the L3 measurement metric includes generating the L1 measurement metric based at least in part on the at least one SSS.

In an eighth aspect, alone or in combination with one or more of the first through seventh aspects, the SSS burst includes at least one PBCH, the at least one PBCH includes a demodulation reference signal, and generating the L1 measurement metric or the L3 measurement metric includes generating the L1 measurement metric or the L3 measurement based at least in part on the at least one PBCH.

In a ninth aspect, alone or in combination with one or more of the first through eighth aspects, process 1100 includes maintaining communication with a serving cell during a first duration associated with receiving the PSS burst from a non-serving cell, and suspending the communication with the serving cell during a second duration associated with receiving the SSS burst from the non-serving cell.

In a tenth aspect, alone or in combination with one or more of the first through ninth aspects, process 1100 includes configuring a measurement gap based at least in part on the second duration.

In an eleventh aspect, alone or in combination with one or more of the first through tenth aspects, the SSS burst includes at least one SSS and at least one PBCH, and process 1100 includes generating a channel estimation based at least in part on the at least one SSS, and recovering information from the PBCH based at least in part on the channel estimation.

In a twelfth aspect, alone or in combination with one or more of the first through eleventh aspects, the SSS burst includes an SSB block, and the at least one SSS and the at least one PBCH are included in the SSB block based at least in part on frequency domain multiplexing.

In a thirteenth aspect, alone or in combination with one or more of the first through twelfth aspects, the at least one SSS and the at least one PBCH are included in the SSB block based at least in part on time domain multiplexing.

In a fourteenth aspect, alone or in combination with one or more of the first through thirteenth aspects, process 1100 includes deriving at least one spatial relationship or forming one or more beams for one or more communication channels associated with a TCI state based at least in part on using at least one PSS included in the PSS burst as a reference signal, and communicating with a network node or another device based at least in part on beamforming the one or more communication channels and a QCL transmission associated with the TCI state.

In a fifteenth aspect, alone or in combination with one or more of the first through fourteenth aspects, the one or more communication channels comprise at least one of a downlink communication channel, or an uplink communication channel In a sixteenth aspect, alone or in combination with one or more of the first through fifteenth aspects, process 1100 includes deriving at least one spatial relationship or forming one or more beams for one or more communication channels associated with a TCI state based at least in part on using at least one SSS included in the SSS burst as a reference signal, and communicating with a network node or another device based at least in part on beamforming the one or more communication channels and a QCL transmission associated with the TCI state.

In a seventeenth aspect, alone or in combination with one or more of the first through sixteenth aspects, the one or more communication channels comprise at least one of a downlink communication channel, or an uplink communication channel.

In an eighteenth aspect, alone or in combination with one or more of the first through seventeenth aspects, the PSS burst includes at least two PSS sequence repetitions, and receiving the PSS burst includes receiving the at least two PSS sequence repetitions in a same time slot.

In a nineteenth aspect, alone or in combination with one or more of the first through eighteenth aspects, receiving the at least two PSS sequence repetitions includes receiving at least a portion of a first repetition of the PSS sequence of the at least two PSS sequence repetitions in the same time slot based at least in part on a first PSS transmit beam, and receiving at least a portion of a second repetition of the PSS sequence of the at least two PSS sequence repetitions in the same time slot based at least in part on a second PSS transmit beam.

In a twentieth aspect, alone or in combination with one or more of the first through nineteenth aspects, receiving the PSS burst includes receiving at least one PSS sequence repetition of the at least two PSS sequence repetitions based at least in part on a PSS beam configured with a first beam width, and receiving the SSS burst includes receiving at least one SSS sequence repetition included in the SSS burst based at least in part on an SSS beam configured with a second beam width.

In a twenty-first aspect, alone or in combination with one or more of the first through twentieth aspects, the first beam width is wider than the second beam width.

In a twenty-second aspect, alone or in combination with one or more of the first through twenty-first aspects, the PSS burst indicates at least one cell group ID, and the SSS burst indicates at least one cell ID that is associated with the at least one cell group ID.

In a twenty-third aspect, alone or in combination with one or more of the first through twenty-second aspects, receiving the SSS burst includes receiving, in an SSS block of the SSS burst, at least one SSS transmit beam associated with transmitting the SSS burst, and receiving, in the SSS block of the SSS burst, at least one PBCH based at least in part on a PBCH transmit beam.

In a twenty-fourth aspect, alone or in combination with one or more of the first through twenty-third aspects, the PBCH occupies at least one symbol of the SSS block.

In a twenty-fifth aspect, alone or in combination with one or more of the first through twenty-fourth aspects, the SSS transmit beam and the PBCH transmit beam are quasi-co-located.

In a twenty-sixth aspect, alone or in combination with one or more of the first through twenty-fifth aspects, receiving the SSS burst includes receiving, in an SSS block of the SSS burst, an SSS based at least in part on an SSS transmit beam, and receiving, in the SSS block of the SSS burst, at least one PBCH based at least in part on the SSS transmit beam.

In a twenty-seventh aspect, alone or in combination with one or more of the first through twenty-sixth aspects, receiving the SSS burst includes receiving the SSS based at least in part on a beam width and a spatial relationship, and receiving the at least PBCH based at least in part on the beam width and the spatial relationship.

In a twenty-eighth aspect, alone or in combination with one or more of the first through twenty-seventh aspects, the at least one PBCH includes a DMRS that is quasi-co-located with the at least one SSS.

In a twenty-ninth aspect, alone or in combination with one or more of the first through twenty-eighth aspects, receiving the SSS burst includes receiving, in an SSS block of the SSS burst, an SSS and a PBCH based at least in part on the SSS and the PBCH being multiplexed in a frequency domain.

In a thirtieth aspect, alone or in combination with one or more of the first through twenty-ninth aspects, receiving the SSS burst includes receiving, in an SSS block of the SSS burst, an SSS and a PBCH based at least in part on the SSS and the PBCH being multiplexed in the time domain.

In a thirty-first aspect, alone or in combination with one or more of the first through thirtieth aspects, receiving the SSS burst includes receiving, in an SSS block of the SSS burst, an SSS and a PBCH based at least in part on the SSS and the PBCH being multiplexed in a frequency domain and the time domain.

In a thirty-second aspect, alone or in combination with one or more of the first through thirty-first aspects, receiving the SSS burst includes receiving, in an SSS block of the SSS burst, an SSS and a PBCH based at least in part on the SSS and the PBCH being interlaced in a frequency domain and the time domain.

In a thirty-third aspect, alone or in combination with one or more of the first through thirty-second aspects, a PSS sequence of the PSS burst includes $M_p$ elements, and an SSS sequence of the SSS burst includes $M_s$ elements, where $M_p$ is a first integer and $M_s$ is a second integer.

In a thirty-fourth aspect, alone or in combination with one or more of the first through thirty-third aspects, an element includes a real or complex number.

In a thirty-fifth aspect, alone or in combination with one or more of the first through thirty-fourth aspects, $M_p$ is equal to $M_s$.

In a thirty-sixth aspect, alone or in combination with one or more of the first through thirty-fifth aspects, $M_p$ is different from $M_s$.

In a thirty-seventh aspect, alone or in combination with one or more of the first through thirty-sixth aspects, the PSS burst occupies a first bandwidth and the SSS burst occupies a second bandwidth.

In a thirty-eighth aspect, alone or in combination with one or more of the first through thirty-seventh aspects, the first bandwidth and the second bandwidth have at least one of a same bandwidth size, different bandwidth sizes, a same center frequency, or different center frequencies.

In a thirty-ninth aspect, alone or in combination with one or more of the first through thirty-eighth aspects, receiving the PSS burst includes receiving a PSS sequence of the PSS burst, receiving the SSS burst includes receiving an SSS sequence of the SSS burst, and receiving the PSS sequence and receiving the SSS sequence comprise at least one of receiving the PSS sequence based at least in part on a first beam width and receiving the SSS sequence based at least in part on the first beam width, receiving the PSS sequence based at least in part on the first beam width and receiving the SSS sequence based at least in part on a second beam width, receiving the PSS sequence based at least in part on a first power level and receiving the SSS sequence based at least in part on the first power level, receiving the PSS sequence based at least in part on the first power level and receiving the SSS sequence based at least in part on a second power level, receiving the PSS sequence based at least in part on a first waveform and receiving the SSS sequence based at least in part on the first waveform, or receiving the PSS sequence based at least in part on the first waveform and receiving the SSS sequence based at least in part on a second waveform.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
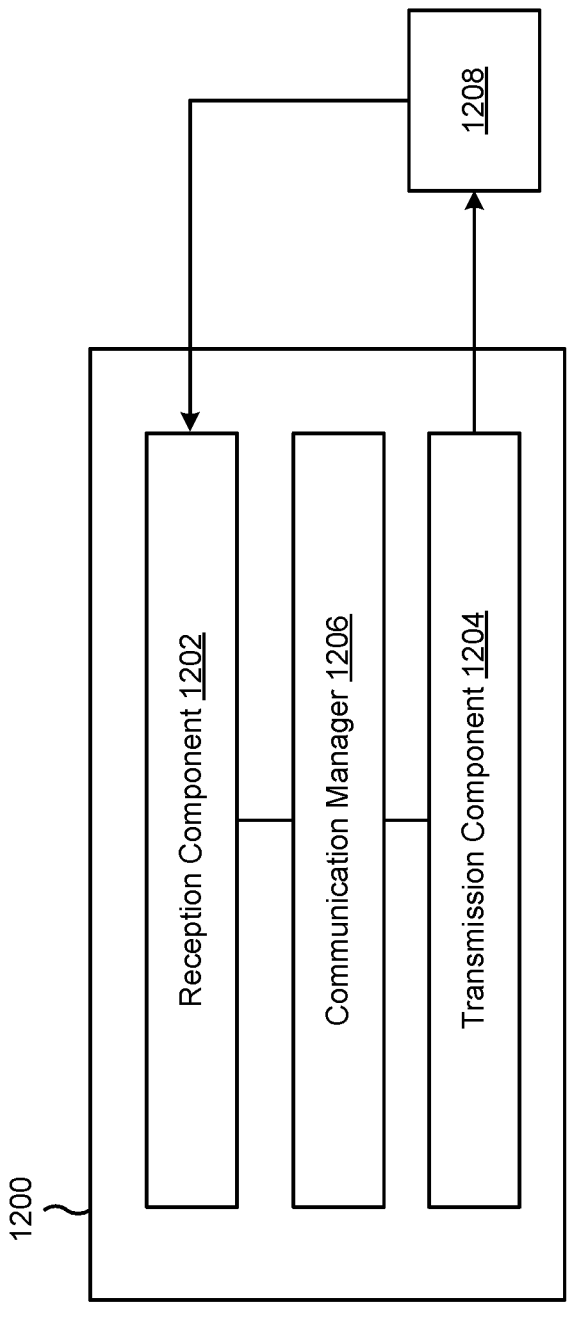
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 3-11. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, based at least in part on a first transmission, a PSS burst. The transmission component 1204 may transmit, based at least in part on a second transmission, an SSS burst, the second transmission being non-overlapping in a time domain with the first transmission.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
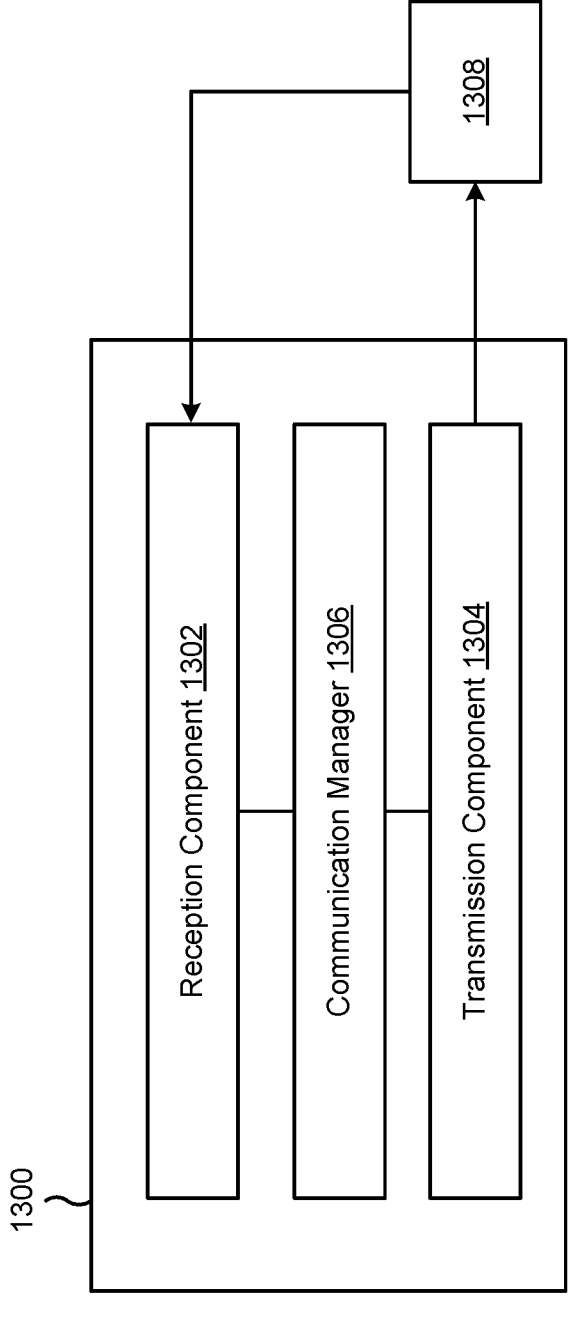
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 3-11. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive, based at least in part on a first transmission, a PSS burst. The reception component 1302 may receive, based at least in part on a second transmission, an SSS burst, the second transmission being non-overlapping in a time domain with the first transmission.

The communication manager 1306 may maintain communication with a serving cell during a first duration associated with receiving the PSS burst from a non-serving cell. The communication manager 1306 may suspend the communication with the serving cell during a second duration associated with receiving the SSS burst from the non-serving cell.

The communication manager 1306 may configure a measurement gap based at least in part on the second duration. The communication manager 1306 may derive at least one spatial relationship or form one or more beams for one or more communication channels associated with a TCI state based at least in part on using at least one PSS included in the PSS burst as a reference signal.

The communication manager 1306 may communicate with a network node or another device based at least in part on beamforming the one or more communication channels and a QCL transmission associated with the TCI state.

The communication manager 1306 may derive at least one spatial relationship or form one or more beams for one or more communication channels associated with a TCI state based at least in part on using at least one SSS included in the SSS burst as a reference signal.

The communication manager 1306 may communicate with a network node or another device based at least in part on beamforming the one or more communication channels and a QCL transmission associated with the TCI state.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a network node, comprising: transmitting, based at least in part on a first transmission, a primary synchronization signal (PSS) burst; and transmitting, based at least in part on a second transmission, a secondary synchronization signal (SSS) burst, the second transmission being non-overlapping in a time domain with the first transmission.

Aspect 2: The method of Aspect 1, wherein the PSS burst comprises at least one of: a first plurality of symbols that are consecutive in the time domain, or a first plurality of time slots that are consecutive in the time domain, wherein the SSS burst comprises at least one of: a second plurality of symbols that are consecutive in the time domain, or a second plurality of time slots that are consecutive in the time domain, and wherein the PSS burst is non-contiguous with the SSS burst based at least in part on at least one of: the first plurality of symbols being disjointed from the second plurality of symbols in the time domain, or the first plurality of time slots being disjointed from the second plurality of time slots in the time domain.

Aspect 3: The method of any of Aspects 1-2, wherein transmitting the PSS burst comprises transmitting the PSS burst based at least in part on a first periodicity, and wherein transmitting the SSS burst comprises transmitting the SSS burst based at least in part on a second periodicity.

Aspect 4: The method of Aspect 3, wherein the first periodicity is different from the second periodicity.

Aspect 5: The method of Aspect 3, wherein the first periodicity and the second periodicity are a same periodicity.

Aspect 6: The method of any of Aspects 1-5, wherein the PSS burst comprises $L_p$ PSS sequence repetitions, wherein the SSS burst comprises $L_s$ SSS sequence repetitions, wherein transmitting the PSS burst comprises: transmitting the $L_p$ PSS sequence repetitions based at least in part on $L_p$ PSS transmit beams, wherein transmitting the SSS burst comprises: transmitting the $L_s$ SSS sequence repetitions based at least in part on $L_s$ SSS transmit beams, and wherein $L_p$ is a first integer and $L_s$ is a second integer.

Aspect 7: The method of Aspect 6, wherein transmitting the $L_p$ PSS sequence repetitions comprises: transmitting a respective PSS sequence repetition of the $L_p$ PSS sequence repetitions based at least in part on a respective PSS transmit beam of the $L_p$ PSS transmit beams, and wherein transmitting the $L_s$ SSS sequences comprises: transmitting a respective SSS sequence repetition of the $L_s$ SSS sequence repetitions based at least in part on a respective SSS transmit beam of the $L_s$ SSS transmit beams.

Aspect 8: The method of Aspect 6, wherein transmitting the $L_p$ PSS sequence repetitions comprises: transmitting the $L_p$ PSS sequence repetitions based at least in part on using $N_p$ time slots, wherein transmitting the $L_s$ SSS sequence repetitions comprises: transmitting the $L_s$ SSS sequence repetitions based at least in part on using $N_s$ time slots, and wherein $N_p$ is a third integer and $N_s$ is a fourth integer.

Aspect 9: The method of Aspect 8, wherein transmitting the $L_p$ PSS sequence repetitions comprises: transmitting the $L_p$ PSS sequence repetitions based at least in part on transmitting at least two PSS transmit beams in a same time slot of the $N_p$ time slots.

Aspect 10: The method of Aspect 9, wherein transmitting the $L_p$ PSS sequence repetitions based at least in part on transmitting the at least two PSS transmit beams in the same time slot comprises: transmitting at least a first PSS sequence repetition of the $L_p$ PSS sequence repetitions in the same time slot using a first PSS transmit beam of the at least two PSS transmit beams; and transmitting at least a second PSS sequence repetition of the $L_p$ PSS sequence repetitions in the same time slot using a second PSS transmit beam of the at least two PSS transmit beams.

Aspect 11: The method of Aspect 6, wherein transmitting the $L_p$ PSS sequence repetitions based at least in part on $L_p$ PSS transmit beams comprises: transmitting each PSS transmit beam of the $L_p$ PSS transmit beams based at least in part on a first beam width, wherein transmitting the L SSS sequence repetitions based at least in part on the $L_s$ SSS transmit beams comprises: transmitting each SSS transmit beam of the $L_s$ SSS transmit beams based at least in part on a second beam width, wherein the first beam width is wider than the second beam width, and wherein $L_p$ is a different value than $L_s$.

Aspect 12: The method of any of Aspects 1-11, wherein the PSS burst indicates at least one cell group identifier (ID), and wherein the SSS burst indicates at least one cell ID that is associated with the at least one cell group ID.

Aspect 13: The method of any of Aspects 1-12, wherein transmitting the SSS burst comprises: transmitting, in an SSS block of the SSS burst, at least one SSS transmit beam associated with transmitting the SSS burst; and transmitting, in the SSS block of the SSS burst, at least one physical broadcast channel (PBCH) based at least in part on a PBCH transmit beam.

Aspect 14. The method of Aspect 13, wherein the PBCH occupies at least one symbol of the SSS block.

Aspect 15: The method of Aspect 13, wherein the SSS transmit beam and the PBCH transmit beam are quasi-co-located.

Aspect 16: The method of any of Aspects 1-15, wherein transmitting the SSS burst comprises: transmitting, in an SSS block of the SSS burst, an SSS based at least in part on an SSS transmit beam; and transmitting, in the SSS block of the SSS burst, at least one physical broadcast channel (PBCH) based at least in part on the SSS transmit beam.

Aspect 17: The method of Aspect 16, wherein the SSS block is a first SSS block in a plurality of SSS blocks associated with the SSS burst, wherein the SSS transmit beam is a first SSS transmit beam in a plurality of SSS transmit beams associated with the SSS burst, and the method further comprises: transmitting, in each respective SSS block of the plurality of SSS blocks SSS burst, a repetition of the SSS based at least in part on a respective SSS transmit beam of the plurality of SSS transmit beams; and transmitting, in the respective SSS block of the SSS burst, a repetition of the at least one PBCH based at least in part on the respective SSS transmit beam.

Aspect 18: The method of Aspect 16, wherein transmitting the SSS burst comprises: transmitting the SSS based at least in part on a beam width and a spatial relationship, and transmitting the at least one PBCH based at least in part on the beam width and the spatial relationship.

Aspect 19: The method of Aspect 18, wherein the at least one PBCH comprises a demodulation reference signal (DMRS) that is quasi-co-located with the at least one SSS.

Aspect 20: The method of any of Aspects 1-19, wherein transmitting the SSS burst comprises: transmitting, in an SSS block of the SSS burst, an SSS and a physical broadcast channel (PBCH) based at least in part on multiplexing the SSS and the PBCH in a frequency domain.

Aspect 21: The method of any of Aspects 1-20, wherein transmitting the SSS burst comprises: transmitting, in an SSS block of the SSS burst, an SSS and a physical broadcast channel (PBCH) based at least in part on multiplexing the SSS and the PBCH in the time domain.

Aspect 22: The method of any of Aspects 1-21, wherein transmitting the SSS burst comprises: transmitting, in an SSS block of the SSS burst, an SSS and a physical broadcast channel (PBCH) based at least in part on multiplexing the SSS and the PBCH in a frequency domain and the time domain.

Aspect 23: The method of any of Aspects 1-22, wherein transmitting the SSS burst comprises: transmitting, in an SSS block of the SSS burst, an SSS and a physical broadcast channel (PBCH) based at least in part on interlacing the SSS and the PBCH in a frequency domain and the time domain.

Aspect 24: The method of any of Aspects 1-23, wherein a PSS sequence of the PSS burst comprises $M_p$ elements, wherein an SSS sequence of the SSS burst comprises $M_s$ elements, and wherein $M_p$ is a first integer and $M_s$ is a second integer.

Aspect 25: The method of Aspect 24, wherein an element comprises a real or complex number.

Aspect 26: The method of Aspect 24, wherein $M_p$ is equal to $M_s$.

Aspect 27: The method of Aspect 24, wherein $M_p$ is different from $M_s$.

Aspect 28: The method of any of Aspects 1-27, wherein the PSS burst occupies a first bandwidth and the SSS burst occupies a second bandwidth.

Aspect 29: The method of Aspect 28, wherein the first bandwidth and the second bandwidth have at least one of: a same bandwidth size, different bandwidth sizes, a same center frequency, or different center frequencies.

Aspect 30: The method of any of Aspects 1-29, wherein transmitting the PSS burst comprises transmitting a PSS sequence of the PSS burst, wherein transmitting the SSS burst comprises transmitting an SSS sequence of the SSS burst, and wherein transmitting the PSS sequence and transmitting the SSS sequence comprise at least one of: transmitting the PSS sequence based at least in part on a first beam width and transmitting the SSS sequence based at least in part on the first beam width, transmitting the PSS sequence based at least in part on the first beam width and transmitting the SSS sequence based at least in part on a second beam width, transmitting the PSS sequence based at least in part on a first power level and transmitting the SSS sequence based at least in part on the first power level, transmitting the PSS sequence based at least in part on the first power level and transmitting the SSS sequence based at least in part on a second power level, transmitting the PSS sequence based at least in part on a first waveform and transmitting the SSS sequence based at least in part on the first waveform, or transmitting the PSS sequence based at least in part on the first waveform and transmitting the SSS sequence based at least in part on a second waveform.

Aspect 31: A method of wireless communication performed by a user equipment (UE), comprising: receiving, based at least in part on a first transmission, a primary synchronization signal (PSS) burst; and receiving, based at least in part on a second transmission, a secondary synchronization signal (SSS) burst, the second transmission being non-overlapping in a time domain with the first transmission.

Aspect 32: The method of Aspect 31, wherein the PSS burst comprises at least one of: a first plurality of symbols that are consecutive in the time domain, or a first plurality of time slots that are consecutive in the time domain, wherein the SSS burst comprises at least one of: a second plurality of symbols that are consecutive in the time domain, or a second plurality of time slots that are consecutive in the time domain, and wherein the PSS burst is non-contiguous with the SSS burst based at least in part on at least one of: the first plurality of symbols being disjointed from the second plurality of symbols in the time domain, or the first plurality of time slots being disjointed from the second plurality of time slots in the time domain.

Aspect 33: The method of any of Aspects 31-32, wherein receiving the PSS burst comprises receiving the PSS burst based at least in part on a first periodicity, and wherein receiving the SSS burst comprises receiving the SSS burst based at least in part on a second periodicity.

Aspect 34: The method of Aspect 33, wherein the first periodicity is different from the second periodicity.

Aspect 35: The method of Aspect 33, wherein the first periodicity and the second periodicity are a same periodicity.

Aspect 36: The method of any of Aspects 31-35, wherein the SSS burst is void of a PSS, and the method further comprises: recovering, from the SSS burst, a cell identifier (ID) without using the PSS burst.

Aspect 37: The method of any of Aspects 31-36, wherein the SSS burst is void of a PSS, and the method further comprises: generating, based at least in part on the SSS burst, a Layer 1 measurement metric or a Layer 3 measurement metric.

Aspect 38: The method of Aspect 37, wherein the SSS burst comprises at least one SSS, and wherein generating the Layer 1 measurement metric or the Layer 3 measurement metric comprises: generating the Layer 1 measurement metric based at least in part on the at least one SSS.

Aspect 39: The method of Aspect 37, wherein the SSS burst comprises at least one physical broadcast channel (PBCH), wherein the at least one PBCH includes a demodulation reference signal, and wherein generating the Layer 1 measurement metric or the Layer 3 measurement metric comprises: generating the Layer 1 measurement metric or the Layer 3 measurement based at least in part on the at least one PBCH.

Aspect 40: The method of any of Aspects 31-39, further comprising: maintaining communication with a serving cell during a first duration associated with receiving the PSS burst from a non-serving cell; and suspending the communication with the serving cell during a second duration associated with receiving the SSS burst from the non-serving cell.

Aspect 41: The method of Aspect 40 further comprising: configuring a measurement gap based at least in part on the second duration.

Aspect 42: The method of any of Aspects 31-41, wherein the SSS burst comprises at least one SSS and at least one physical broadcast channel (PBCH), and the method further comprises: generating a channel estimation based at least in part on the at least one SSS; and recovering information from the PBCH based at least in part on the channel estimation.

Aspect 43: The method of Aspect 42, wherein the SSS burst comprises an SSB block, and wherein the at least one SSS and the at least one PBCH are included in the SSB block based at least in part on frequency domain multiplexing.

Aspect 44: The method of Aspect 43, wherein the at least one SSS and the at least one PBCH are included in the SSB block based at least in part on time domain multiplexing.

Aspect 45: The method of any of Aspects 31-44, further comprising: deriving at least one spatial relationship or forming one or more beams for one or more communication channels associated with a transmission channel indicator (TCI) state based at least in part on using at least one PSS included in the PSS burst as a reference signal; and communicating with a network node or another device based at least in part on beamforming the one or more communication channels and a quasi-co-located (QCL) transmission associated with the TCI state.

Aspect 46: The method of Aspect 45, wherein the one or more communication channels comprise at least one of: a downlink communication channel, or an uplink communication channel.

Aspect 47: The method of any of Aspects 31-46, further comprising: deriving at least one spatial relationship or forming one or more beams for one or more communication channels associated with a transmission channel indicator (TCI) state based at least in part on using at least one SSS included in the SSS burst as a reference signal; and communicating with a network node or another device based at least in part on beamforming the one or more communication channels and a quasi-co-located (QCL) transmission associated with the TCI state.

Aspect 48: The method of Aspect 47, wherein the one or more communication channels comprise at least one of: a downlink communication channel, or an uplink communication channel.

Aspect 49: The method of any of Aspects 31-48, wherein the PSS burst includes at least two PSS sequence repetitions, and wherein receiving the PSS burst comprises: receiving the at least two PSS sequence repetitions in a same time slot.

Aspect 50: The method of Aspect 49, wherein receiving the at least two PSS sequence repetitions comprises: receiving at least a portion of a first repetition of the PSS sequence of the at least two PSS sequence repetitions in the same time slot based at least in part on a first PSS transmit beam; and receiving at least a portion of a second repetition of the PSS sequence of the at least two PSS sequence repetitions in the same time slot based at least in part on a second PSS transmit beam.

Aspect 51: The method of Aspect 49, wherein receiving the PSS burst comprises: receiving at least one PSS sequence repetition of the at least two PSS sequence repetitions based at least in part on a PSS beam configured with a first beam width, and wherein receiving the SSS burst comprises: receiving at least one SSS sequence repetition included in the SSS burst based at least in part on an SSS beam configured with a second beam width.

Aspect 52: The method of Aspect 51, wherein the first beam width is wider than the second beam width.

Aspect 53: The method of any of Aspects 31-52, wherein the PSS burst indicates at least one cell group identifier (ID), and wherein the SSS burst indicates at least one cell ID that is associated with the at least one cell group ID.

Aspect 54: The method of any of Aspects 31-53, wherein receiving the SSS burst comprises: receiving, in an SSS block of the SSS burst, at least one SSS transmit beam associated with transmitting the SSS burst; and receiving, in the SSS block of the SSS burst, at least one physical broadcast channel (PBCH) based at least in part on a PBCH transmit beam.

Aspect 55: The method of Aspect 54, wherein the PBCH occupies at least one symbol of the SSS block.

Aspect 56: The method of Aspect 54, wherein the SSS transmit beam and the PBCH transmit beam are quasi-co-located.

Aspect 57: The method of any of Aspects 31-56, wherein receiving the SSS burst comprises: receiving, in an SSS block of the SSS burst, an SSS based at least in part on an SSS transmit beam; and receiving, in the SSS block of the SSS burst, at least one physical broadcast channel (PBCH) based at least in part on the SSS transmit beam.

Aspect 58: The method of Aspect 57, wherein receiving the SSS burst comprises: receiving the SSS based at least in part on a beam width and a spatial relationship, and receiving the at least PBCH based at least in part on the beam width and the spatial relationship.

Aspect 59: The method of Aspect 58, wherein the at least one PBCH comprises a demodulation reference signal (DMRS) that is quasi-co-located with the at least one SSS.

Aspect 60: The method of any of Aspects 31-59, wherein receiving the SSS burst comprises: receiving, in an SSS block of the SSS burst, an SSS and a physical broadcast channel (PBCH) based at least in part on the SSS and the PBCH being multiplexed in a frequency domain.

Aspect 61: The method of any of Aspects 31-60, wherein receiving the SSS burst comprises: receiving, in an SSS block of the SSS burst, an SSS and a physical broadcast channel (PBCH) based at least in part on the SSS and the PBCH being multiplexed in the time domain.

Aspect 62: The method of any of Aspects 31-61, wherein receiving the SSS burst comprises: receiving, in an SSS block of the SSS burst, an SSS and a physical broadcast channel (PBCH) based at least in part on the SSS and the PBCH being multiplexed in a frequency domain and the time domain.

Aspect 63: The method of any of Aspects 31-62, wherein receiving the SSS burst comprises: receiving, in an SSS block of the SSS burst, an SSS and a physical broadcast channel (PBCH) based at least in part on the SSS and the PBCH being interlaced in a frequency domain and the time domain.

Aspect 64: The method of any of Aspects 31-63, wherein a PSS sequence of the PSS burst comprises $M_p$ elements, wherein an SSS sequence of the SSS burst comprises $M_s$ elements, and wherein $M_p$ is a first integer and $M_s$ is a second integer.

Aspect 65: The method of Aspect 64, wherein an element comprises a real or complex number.

Aspect 66: The method of Aspect 65, wherein $M_p$ is equal to $M_s$.

Aspect 67: The method of Aspect 65, wherein $M_p$ is different from $M_s$.

Aspect 68: The method of any of Aspects 31-67, wherein the PSS burst occupies a first bandwidth and the SSS burst occupies a second bandwidth.

Aspect 69: The method of Aspect 68, wherein the first bandwidth and the second bandwidth have at least one of: a same bandwidth size, different bandwidth sizes, a same center frequency, or different center frequencies.

Aspect 70: The method of any of Aspects 31-69, wherein receiving the PSS burst comprises receiving a PSS sequence of the PSS burst, wherein receiving the SSS burst comprises receiving an SSS sequence of the SSS burst, and wherein receiving the PSS sequence and receiving the SSS sequence comprise at least one of: receiving the PSS sequence based at least in part on a first beam width and receiving the SSS sequence based at least in part on the first beam width, receiving the PSS sequence based at least in part on the first beam width and receiving the SSS sequence based at least in part on a second beam width, receiving the PSS sequence based at least in part on a first power level and receiving the SSS sequence based at least in part on the first power level, receiving the PSS sequence based at least in part on the first power level and receiving the SSS sequence based at least in part on a second power level, receiving the PSS sequence based at least in part on a first waveform and receiving the SSS sequence based at least in part on the first waveform, or receiving the PSS sequence based at least in part on the first waveform and receiving the SSS sequence based at least in part on a second waveform.

Aspect 71: An apparatus for wireless communication at a device, comprising a processor; memory coupled with the processor; and instructions stored in the memory and executable by the processor to cause the apparatus to perform the method of one or more of Aspects 1-30.

Aspect 72: An apparatus for wireless communication at a device, comprising a processor; memory coupled with the processor; and instructions stored in the memory and executable by the processor to cause the apparatus to perform the method of one or more of Aspects 31-70.

Aspect 73: A device for wireless communication, comprising one or more memories and one or more processors coupled to the one or more memories, the one or more processors configured, individually or collectively, to perform the method of one or more of Aspects 1-30.

Aspect 74: A device for wireless communication, comprising one or more memories and one or more processors coupled to the one or more memories, the one or more processors configured, individually or collectively, to perform the method of one or more of Aspects 31-70.

Aspect 75: An apparatus for wireless communication, comprising at least one means for performing the method of one or more of Aspects 1-30.

Aspect 76: An apparatus for wireless communication, comprising at least one means for performing the method of one or more of Aspects 31-70.

Aspect 74: A non-transitory computer-readable medium storing code for wireless communication, the code comprising instructions executable by a processor to perform the method of one or more of Aspects 1-30.

Aspect 75: A non-transitory computer-readable medium storing code for wireless communication, the code comprising instructions executable by a processor to perform the method of one or more of Aspects 31-70.

Aspect 76: A non-transitory computer-readable medium storing a set of instructions for wireless communication, the set of instructions comprising one or more instructions that, when executed by one or more processors of a device, cause the device to perform the method of one or more of Aspects 1-30.

Aspect 77: A non-transitory computer-readable medium storing a set of instructions for wireless communication, the set of instructions comprising one or more instructions that, when executed by one or more processors of a device, cause the device to perform the method of one or more of Aspects 31-70.

The foregoing disclosure provides illustration and description but is not intended to be exhaustive or to limit the aspects to the precise forms disclosed.

Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:

one or more memories; and one or more processors, coupled to the one or more memories, configured, individually or collectively, to cause the network node to:

transmit, based at least in part on a first transmission, a primary synchronization signal (PSS) burst; and transmit, based at least in part on a second transmission, a secondary synchronization signal (SSS) burst, the second transmission being non-overlapping in a time domain with the first transmission, wherein a quantity of PSS sequence repetitions of the PSS burst is equal to a quantity of PSS communication beams, and wherein a quantity of SSS sequence repetitions of the SSS burst is equal to a quantity of SSS communication beams, wherein the quantity of PSS sequence repetitions is different from the quantity of SSS sequence repetitions, wherein the quantity of PSS communication beams is different from the quantity of SSS communication beams, wherein the PSS communication beams comprise PSS transmit beams, and wherein the SSS communication beams comprise SSS transmit beams.

2. The apparatus of claim 1, wherein the PSS burst comprises at least one of:

a first plurality of symbols that are consecutive in the time domain, or a first plurality of time slots that are consecutive in the time domain, wherein the SSS burst comprises at least one of:

a second plurality of symbols that are consecutive in the time domain, or a second plurality of time slots that are consecutive in the time domain, and wherein the PSS burst is non-contiguous with the SSS burst based at least in part on at least one of:

the first plurality of symbols being disjointed from the second plurality of symbols in the time domain, or the first plurality of time slots being disjointed from the second plurality of time slots in the time domain.

3. The apparatus of claim 1, wherein the one or more processors, to cause the network node to transmit the PSS burst, are configured to cause the network node to:

transmit the quantity of PSS sequence repetitions based at least in part on the quantity of PSS communication beams, wherein the one or more processors, to cause the network node to transmit the SSS burst, are configured to cause the network node to:

transmit the quantity of SSS sequence repetitions based at least in part on the quantity of SSS communication beams.

4. The apparatus of claim 1, wherein the one or more processors, to cause the network node to transmit the SSS burst, are configured to cause the network node to:

transmit, in an SSS block of the SSS burst, at least one SSS transmit beam that is associated with transmitting the SSS burst; and transmit, in the SSS block of the SSS burst, at least one physical broadcast channel (PBCH) based at least in part on a PBCH transmit beam.

5. The apparatus of claim 1, wherein the one or more processors, to cause the network node to transmit the SSS burst, are configured to cause the network node to:

transmit, in an SSS block of the SSS burst, an SSS based at least in part on an SSS transmit beam; and transmit, in the SSS block of the SSS burst, at least one physical broadcast channel (PBCH) based at least in part on the SSS transmit beam.

6. The apparatus of claim 1, wherein the one or more processors, to cause the network node to transmit the SSS burst, are configured to cause the network node to:

transmit, in an SSS block of the SSS burst, an SSS and a physical broadcast channel (PBCH) based at least in part on multiplexing the SSS and the PBCH in a frequency domain.

7. The apparatus of claim 1, wherein the one or more processors, to cause the network node to transmit the SSS burst, are configured to cause the network node to:

transmit, in an SSS block of the SSS burst, an SSS and a physical broadcast channel (PBCH) based at least in part on multiplexing the SSS and the PBCH in the time domain.

8. The apparatus of claim 1, wherein the one or more processors, to cause the network node to transmit the SSS burst, are configured to cause the network node to:

transmit, in an SSS block of the SSS burst, an SSS and a physical broadcast channel (PBCH) based at least in part on multiplexing the SSS and the PBCH in a frequency domain and the time domain.

9. The apparatus of claim 1, wherein the one or more processors, to cause the network node to transmit the SSS burst, are configured to cause the network node to:

transmit, in an SSS block of the SSS burst, an SSS and a physical broadcast channel (PBCH) based at least in part on interlacing the SSS and the PBCH in a frequency domain and the time domain.

10. The apparatus of claim 1, wherein the one or more processors, to cause the network node to transmit the PSS burst, are configured to cause the network node to transmit a PSS sequence of the PSS burst, wherein the one or more processors, to cause the network node to transmit the SSS burst, are configured to cause the network node to transmit an SSS sequence of the SSS burst, and wherein the one or more processors, to cause the network node to transmit the PSS sequence and transmit the SSS sequence, are configured to cause the network node to:

transmit the PSS sequence based at least in part on a first beam width and transmit the SSS sequence based at least in part on the first beam width, transmit the PSS sequence based at least in part on the first beam width and transmit the SSS sequence based at least in part on a second beam width, transmit the PSS sequence based at least in part on a first power level and transmit the SSS sequence based at least in part on the first power level, transmit the PSS sequence based at least in part on the first power level and transmit the SSS sequence based at least in part on a second power level, transmit the PSS sequence based at least in part on a first waveform and transmit the SSS sequence based at least in part on the first waveform, or transmit the PSS sequence based at least in part on the first waveform and transmit the SSS sequence based at least in part on a second waveform.

11. The apparatus of claim 1, wherein the PSS burst is void of an SSS and a physical broadcast channel (PBCH), wherein the SSS burst is void of a PSS, and wherein the SSS burst comprises an SSS and the PBCH.

12. An apparatus for wireless communication at a user equipment (UE), comprising:

one or more memories; and one or more processors, coupled to the one or more memories, configured, individually or collectively, to cause the UE to:

receive, based at least in part on a first transmission, a primary synchronization signal (PSS) burst; and receive, based at least in part on a second transmission, a secondary synchronization signal (SSS) burst, the second transmission being non-overlapping in a time domain with the first transmission, wherein a quantity of PSS sequence repetitions of the PSS burst is equal to a quantity of PSS communication beams, and wherein a quantity of SSS sequence repetitions of the SSS burst is equal to a quantity of SSS communication beams, wherein the quantity of PSS sequence repetitions is different from the quantity of SSS sequence repetitions, wherein the quantity of PSS communication beams is different from the quantity of SSS communication beams, wherein the PSS communication beams comprise PSS receive beams, and wherein the SSS communication beams comprise SSS receive beams.

13. The apparatus of claim 12, wherein the PSS burst comprises at least one of:

a first plurality of symbols that are consecutive in the time domain, or a first plurality of time slots that are consecutive in the time domain, wherein the SSS burst comprises at least one of:

a second plurality of symbols that are consecutive in the time domain, or a second plurality of time slots that are consecutive in the time domain, and wherein the PSS burst is non-contiguous with the SSS burst based at least in part on at least one of:

the first plurality of symbols being disjointed from the second plurality of symbols in the time domain, or the first plurality of time slots being disjointed from the second plurality of time slots in the time domain.

14. The apparatus of claim 12, wherein the one or more processors are further configured to cause the UE to:

recover, from the SSS burst, a cell identifier (ID) without using the PSS burst.

15. The apparatus of claim 12, wherein the one or more processors are further configured to cause the UE to:

generate, based at least in part on the SSS burst, a Layer 1 measurement metric or a Layer 3 measurement metric.

16. The apparatus of claim 12, wherein the one or more processors are further configured to cause the UE to:

maintain communication with a serving cell during a first duration associated with receiving the PSS burst from a non-serving cell; and suspend the communication with the serving cell during a second duration associated with receiving the SSS burst from the non-serving cell.

17. The apparatus of claim 12, wherein the SSS burst comprises at least one SSS and at least one physical broadcast channel (PBCH), and wherein the one or more processors are further configured to cause the UE to:

generate a channel estimation based at least in part on the at least one SSS; and recover information from the PBCH based at least in part on the channel estimation.

18. The apparatus of claim 12, wherein the one or more processors are further configured to cause the UE to:

derive at least one spatial relationship or form one or more beams for one or more communication channels associated with a transmission channel indicator (TCI) state based at least in part on using at least one PSS included in the PSS burst as a reference signal; and communicate with a network node or another device based at least in part on beamforming the one or more communication channels and a quasi-co-located (QCL) transmission associated with the TCI state.

19. The apparatus of claim 12, wherein the one or more processors are further configured to cause the UE to:

derive at least one spatial relationship or form one or more beams for one or more communication channels associated with a transmission channel indicator (TCI) state based at least in part on using at least one SSS included in the SSS burst as a reference signal; and communicate with a network node or another device based at least in part on beamforming the one or more communication channels and a quasi-co-located (QCL) transmission associated with the TCI state.

20. The apparatus of claim 12, wherein the PSS burst includes at least two PSS sequence repetitions, and wherein the one or more processors, to cause the UE to receive the PSS burst, are configured to cause the UE to:

receive the at least two PSS sequence repetitions in a same time slot.

21. The apparatus of claim 12, wherein the one or more processors, to cause the UE to receive the SSS burst, are configured to cause the UE to:

receive, in an SSS block of the SSS burst, at least one SSS transmit beam associated with transmitting the SSS burst; and receive, in the SSS block of the SSS burst, at least one physical broadcast channel (PBCH) based at least in part on a PBCH transmit beam.

22. The apparatus of claim 12, wherein the one or more processors, to cause the UE to receive the SSS burst, are configured to cause the UE to:

receive, in an SSS block of the SSS burst, an SSS based at least in part on an SSS transmit beam; and receive, in the SSS block of the SSS burst, at least one physical broadcast channel (PBCH) based at least in part on the SSS transmit beam.

23. The apparatus of claim 12, wherein the one or more processors, to cause the UE to receive the SSS burst, are configured to cause the UE to:

receive, in an SSS block of the SSS burst, an SSS and a physical broadcast channel (PBCH) based at least in part on the SSS and the PBCH being multiplexed in a frequency domain.

24. The apparatus of claim 12, wherein the one or more processors, to cause the UE to receive the SSS burst, are configured to cause the UE to:

receive, in an SSS block of the SSS burst, an SSS and a physical broadcast channel (PBCH) based at least in part on the SSS and the PBCH being multiplexed in the time domain.

25. The apparatus of claim 12, wherein the one or more processors, to cause the UE to receive the SSS burst, are configured to cause the UE to:

receive, in an SSS block of the SSS burst, an SSS and a physical broadcast channel (PBCH) based at least in part on the SSS and the PBCH being multiplexed in a frequency domain and the time domain.

26. The apparatus of claim 12, wherein the one or more processors, to cause the UE to receive the SSS burst, are configured to cause the UE to:

receive, in an SSS block of the SSS burst, an SSS and a physical broadcast channel (PBCH) based at least in part on the SSS and the PBCH being interlaced in a frequency domain and the time domain.

27. A method of wireless communication performed by a network node, comprising:

transmitting, based at least in part on a first transmission, a primary synchronization signal (PSS) burst; and transmitting, based at least in part on a second transmission, a secondary synchronization signal (SSS) burst, the second transmission being non-overlapping in a time domain with the first transmission, wherein a quantity of PSS sequence repetitions of the PSS burst is equal to a quantity of PSS communication beams, and wherein a quantity of SSS sequence repetitions of the SSS burst is equal to a quantity of SSS communication beams, wherein the quantity of PSS sequence repetitions is different from the quantity of SSS sequence repetitions, wherein the quantity of PSS communication beams is different from the quantity of SSS communication beams, wherein the PSS communication beams comprise PSS transmit beams, and wherein the SSS communication beams comprise SSS transmit beams.

28. The method of claim 27, wherein the PSS burst comprises at least one of:

a first plurality of symbols that are consecutive in the time domain, or a first plurality of time slots that are consecutive in the time domain, wherein the SSS burst comprises at least one of:

a second plurality of symbols that are consecutive in the time domain, or a second plurality of time slots that are consecutive in the time domain, and wherein the PSS burst is non-contiguous with the SSS burst based at least in part on at least one of:

the first plurality of symbols being disjointed from the second plurality of symbols in the time domain, or the first plurality of time slots being disjointed from the second plurality of time slots in the time domain.

29. The method of claim 27, wherein transmitting the PSS burst comprises transmitting the PSS burst based at least in part on a first periodicity, and wherein transmitting the SSS burst comprises transmitting the SSS burst based at least in part on a second periodicity.

30. A method of wireless communication performed by a user equipment (UE), comprising:

receiving, based at least in part on a first transmission, a primary synchronization signal (PSS) burst; and receiving, based at least in part on a second transmission, a secondary synchronization signal (SSS) burst, the second transmission being non-overlapping in a time domain with the first transmission, wherein a quantity of PSS sequence repetitions of the PSS burst is equal to a quantity of PSS communication beams, and wherein a quantity of SSS sequence repetitions of the SSS burst is equal to a quantity of SSS communication beams, wherein the quantity of PSS sequence repetitions is different from the quantity of SSS sequence repetitions, wherein the quantity of PSS communication beams is different from the quantity of SSS communication beams, wherein the PSS communication beams comprise PSS receive beams, and wherein the SSS communication beams comprise SSS receive beams.

\* \* \* \* \*